United States Patent
Jeong et al.

(10) Patent No.: US 10,440,287 B2
(45) Date of Patent: Oct. 8, 2019

(54) METHOD OF OBTAINING WIDE DYNAMIC RANGE IMAGE AND IMAGE PICKUP DEVICE PERFORMING THE SAME

(71) Applicant: Samsung Electronics Co., Ltd., Suwon-si (KR)

(72) Inventors: Young-Kyun Jeong, Hwaseong-si (KR); Jin-Ho Seo, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/838,749

(22) Filed: Dec. 12, 2017

(65) Prior Publication Data
US 2018/0167544 A1    Jun. 14, 2018

(30) Foreign Application Priority Data
Dec. 12, 2016    (KR) .................. 10-2016-0168351

(51) Int. Cl.
| | |
|---|---|
| *H04N 5/235* | (2006.01) |
| *H04N 5/353* | (2011.01) |
| *G06T 5/50* | (2006.01) |
| *H04N 5/355* | (2011.01) |

(52) U.S. Cl.
CPC ............ *H04N 5/2355* (2013.01); *G06T 5/50* (2013.01); *H04N 5/235* (2013.01); *H04N 5/3535* (2013.01); *H04N 5/35554* (2013.01); *H04N 5/35581* (2013.01); *G06T 2207/10144* (2013.01); *G06T 2207/20208* (2013.01)

(58) Field of Classification Search
CPC ............ H04N 5/2355; H04N 5/35554; H04N 5/35581; H04N 5/235; H04N 5/3535; G06T 5/50; G06T 2207/20208; G06T 2207/10144
See application file for complete search history.

(56) References Cited

U.S. PATENT DOCUMENTS

| | | | |
|---|---|---|---|
| 7,050,094 B2 | 5/2006 | Krymski | |
| 7,565,077 B2 | 7/2009 | Rai et al. | |
| 8,285,134 B2 | 10/2012 | Joo | |
| 8,605,177 B2 | 12/2013 | Rossi et al. | |
| 9,137,454 B2 | 9/2015 | Yang et al. | |
| 2012/0188392 A1* | 7/2012 | Smith | H04N 5/2355 348/222.1 |
| 2015/0312463 A1* | 10/2015 | Gupta | H04N 5/2352 348/239 |

(Continued)

*Primary Examiner* — Gevell V Selby
(74) *Attorney, Agent, or Firm* — Muir Patent Law, PLLC

(57) ABSTRACT

In a method of obtaining a wide dynamic range (WDR) image, a first subframe image having pixel data obtained with a first exposure time is generated by performing a first readout operation of a plurality of pixels of an image sensor. A second subframe image having pixel data obtained with a second exposure time and a third exposure time is generated by performing a second readout operation of the plurality of pixels. The first exposure time, the second exposure time and the third exposure time are different from one another. A current frame image having pixel data obtained from pixel exposures with the first exposure time, the second exposure time and the third exposure time is generated by combining the first subframe image with the second subframe image.

20 Claims, 21 Drawing Sheets

(56) References Cited

U.S. PATENT DOCUMENTS

| | | | | |
|---|---|---|---|---|
| 2016/0037043 A1* | 2/2016 | Wang | ................... | H04N 5/2355 |
| | | | | 382/275 |
| 2016/0255262 A1* | 9/2016 | Lee | ...................... | H04N 5/2355 |
| | | | | 348/222.1 |

* cited by examiner

METHOD OF OBTAINING WIDE DYNAMIC RANGE IMAGE AND IMAGE PICKUP DEVICE PERFORMING THE SAME

CROSS-REFERENCE TO RELATED APPLICATION

This application claims priority under 35 USC § 119 to Korean Patent Application No. 10-2016-0168351, filed on Dec. 12, 2016 in the Korean Intellectual Property Office (KIPO), the contents of which are herein incorporated by reference in their entirety.

BACKGROUND

1. Technical Field

Example embodiments relate generally to image obtaining and processing, and more particularly to methods of obtaining wide dynamic range images and image pickup devices performing the methods.

2. Description of the Related Art

Image recording devices (e.g., cameras) have been adopted in various electronic systems and mobile systems such as, for example, computers, mobile phones, tablets, virtual reality (VR) equipment, and robotic systems. When a subject is photographed using a camera, if a background of the subject is too bright, the subject is relatively dark, which is called back light. Back light compensation (BLC) is required to acquire a better quality image. A wide dynamic range (WDR) technology combines an image in which a bright area is clearly seen by controlling exposure thereof and different images in which dark areas are clearly seen by controlling exposure thereof, and generates an image in which bright and dark areas are very clearly seen.

SUMMARY

Accordingly, the present disclosure is provided to substantially obviate one or more problems due to limitations and disadvantages of the related art.

At least one example embodiment of the present disclosure provides a method of efficiently obtaining a wide dynamic range image using relatively few resources.

At least one example embodiment of the present disclosure provides an image pickup device that performs the method of obtaining the wide dynamic range image.

According to example embodiments, in a method of obtaining a wide dynamic range (WDR) image, a first subframe image having a first exposure time is generated by performing a first readout operation on all of a plurality of pixels. A second subframe image having a second exposure time and a third exposure time is generated by performing a second readout operation on all of the plurality of pixels. The first exposure time, the second exposure time and the third exposure time are different from one another. A current frame image having the first exposure time, the second exposure time and the third exposure time is generated by combining the first subframe image with the second subframe image.

According to example embodiments, an image pickup device includes an image sensor and an image signal processor. The image sensor includes a pixel array and a readout circuit. The pixel array includes a plurality of pixels. The readout circuit generates a first subframe image having a first exposure time by performing a first readout operation on all of the plurality of pixels, and generates a second subframe image having a second exposure time and a third exposure time by performing a second readout operation on all of the plurality of pixels. The first exposure time, the second exposure time and the third exposure time are different from one another. The image signal processor generates a current frame image having the first exposure time, the second exposure time and the third exposure time by combining the first subframe image with the second subframe image.

In the method of obtaining the WDR image and the image pickup device according to example embodiments, the current frame image having a high or extended dynamic range may be generated by combining the plurality of subframe images having different exposure times. Among the plurality of subframe images to be combined, at least one subframe image may have a single and the same exposure time for the whole region, and at least another subframe image may have different exposure times for different regions. Accordingly, the number of the exposure times included in the current frame image may be greater than the number of the subframe images, and thus a frame image having a relatively high or extended dynamic range may be generated with relatively low computation and low power consumption.

BRIEF DESCRIPTION OF THE DRAWINGS

Illustrative, non-limiting example embodiments will be more clearly understood from the following detailed description taken in conjunction with the accompanying drawings.

FIG. 2 is a diagram for describing a method of obtaining a WDR image according to example embodiments.

FIGS. 13, 14 and 15 are diagrams for describing a method of obtaining a WDR image according to example embodiments.

FIGS. 17 and 18 are diagrams for describing a method of obtaining a WDR image according to example embodiments.

DETAILED DESCRIPTION OF THE EMBODIMENTS

Figure 1:
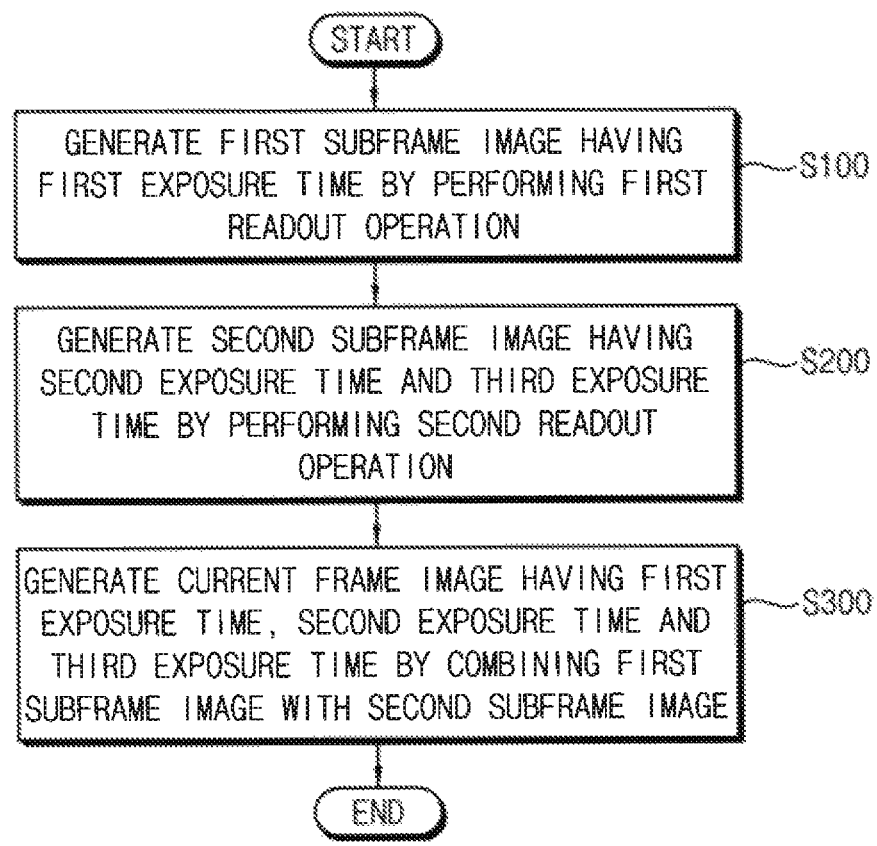
FIG. 1 is a flow chart illustrating a method of obtaining a wide dynamic range (WDR) image according to example embodiments.

The present disclosure now will be described more fully hereinafter with reference to the accompanying drawings, in which various exemplary embodiments are shown. The invention may, however, be embodied in many different forms and should not be construed as limited to the exemplary embodiments set forth herein. These example exemplary embodiments are just that—examples—and many embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

It will be understood that, although the terms first, second, third etc. may be used herein to describe various elements, components, and/or sections, these elements, components, and/or sections should not be limited by these terms. Unless the context indicates otherwise, these terms are only used to distinguish one element, component, or section from another element, component, or section, for example as a naming convention. Thus, a first element, component, or section discussed below in one section of the specification could be termed a second element, component, or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

As is traditional in the field of the disclosed technology, features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 2:
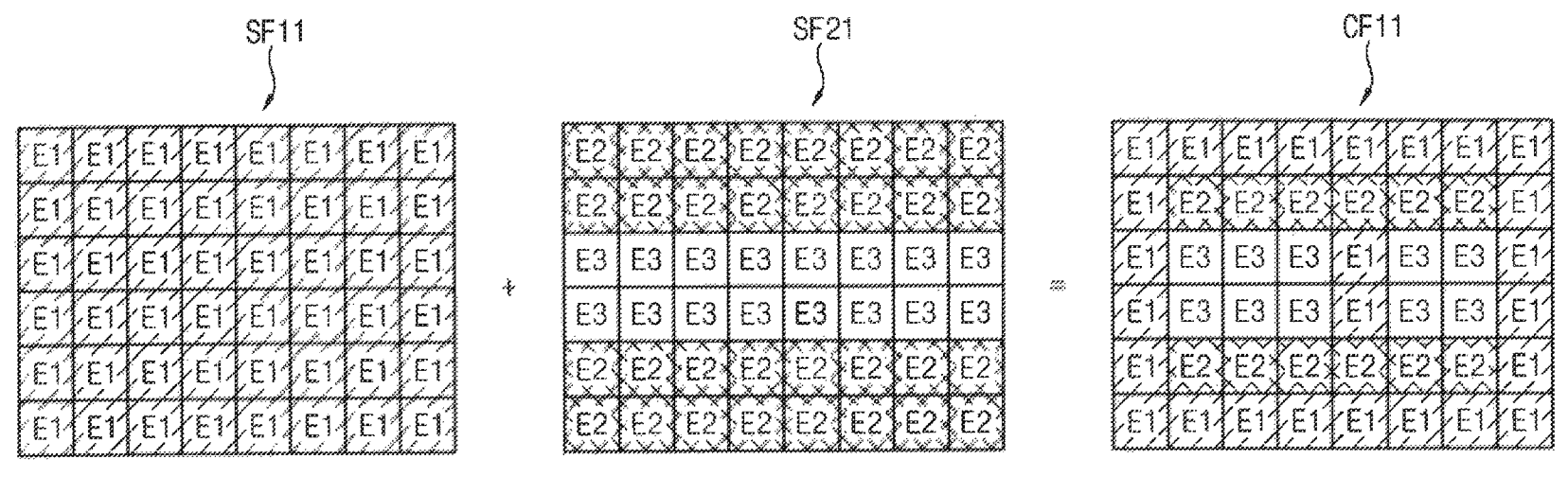

FIG. 1 is a flow chart illustrating a method of obtaining a wide dynamic range (WDR) image according to example embodiments. FIG. 2 is a diagram for describing a method of obtaining a WDR image according to example embodiments. FIG. 2 illustrates arrangements of exposure times in subframe images and a current frame image. In FIG. 2, each square included in the subframe images and/or the current frame image may represent a single pixel.

Referring to FIGS. 1 and 2, in a method of obtaining a WDR image according to example embodiments, a first subframe image SF11 having a first exposure time E1 is generated by performing a first readout operation on all of a plurality of pixels (step S100). The plurality of pixels may be pixels of an image sensor, such as a CMOS image sensor (CIS) or a charge coupled device (CCD) image sensor. All of a plurality of pixels in step S100 may comprise all of the pixels if the image sensor, or a contiguous area (e.g., a rectangular area of a portion of the image sensor, e.g., in response to image stabilization processing). To obtain (e.g., photograph or pick up) the first subframe image SF11, the same exposure time (e.g., the first exposure time E1) is set for all the pixels of the whole region or area. The first readout operation represents an operation of reading out pixel data from all of the plurality of pixels generated during one exposure period corresponding to one subframe image. The exposure period of one subframe image may not overlap with the exposure period of another subframe image. The exposure time periods of the pixels during an exposure period may all start and end at the same time, or the exposure time periods of the pixels during an exposure period may be different, such as staggered sequentially. The exposure period of a pixel as used herein refers to the time the pixel is collecting intensity information of light impinging on the pixel that has been received from an external source. The exposure period of a pixel may correspond to the time the pixel is receiving light from an image source (e.g., light from an external scene through a camera lens) or may correspond only to a selected time period in which the pixel is enabled to collect intensity information of light impinging the pixel. A pixel may comprise several sub-pixels (e.g., a red subpixel, a green subpixel and a blue subpixel) each of which collect intensity information corresponding to the color of the subpixel (e.g., by providing a red, green and blue filter between the light source and a photocurrent generator (e.g., photodiode) of the subpixel). The intensity information of the pixel may correspond to the intensity information of each of the subpixels of the pixel. The first subframe image SF11 may be referred to as the all-pixels single-exposure frame.

A second subframe image SF21 having a second exposure time E2 and a third exposure time E3 is generated by performing a second readout operation on all of the plurality of pixels (step S200). The first exposure time E1, the second exposure time E2 and the third exposure time E3 are different from one another. To obtain the second subframe image SF21, different exposure times (e.g., the second exposure time E2 and the third exposure time E3) are set for different regions or areas (e.g., depending on locations of pixels). As with the first readout operation, the second readout operation also represents an operation of reading out a plurality of pixel data from all of the plurality of pixels of the image sensor (or the portion used to generate the subframe), which may be substantially at the same time and during one read out operation initiated prior to commencing a subsequent subframe exposure operation. The second subframe image SF21 may be referred to as the pixel-level multi-exposure frame.

In the example of FIG. 2, a first region and a second region in the second subframe image SF21 may be formed in horizontal stripes. Thus, the first and second regions in the second subframe image SF21 may be alternately arranged or disposed along a vertical direction (e.g., a direction from top to bottom). The first region in the second subframe image SF21 may correspond to the second exposure time E2, and the second region in the second subframe image SF21 may correspond to the third exposure time E3. As will be described later, an arrangement of the first and second regions in the second subframe image may vary according to example embodiments.

A current frame image CF11 by combining the first subframe image SF11 with the second subframe image SF21 (step S300). Pixels of the current frame image CF11 may include information of pixel data obtained during exposure of pixels during the first exposure time E1, and pixel data obtained during exposure of pixels during the second exposure time E2 and the third exposure time E3. For example, the first subframe image SF11 may be defined as a base subframe image (or a background subframe image), the second subframe image SF21 may be defined as a dependant subframe image, and then the current frame image CF11 may be obtained by replacing (or substituting) some portions of the base subframe image with some portions of the dependant subframe image. In other examples, the current frame image CF11 may be obtained by merging (e.g., averaging or performing interpolation of neighboring pixel data) portions of the base subframe image with some portions of the dependent subframe image. In comparison with the subframe images SF11 and SF21, the current frame image CF11 may have a relatively high or extended dynamic range. Thus, the current frame image CF11 may be a WDR image.

In some example embodiments, the number of exposure times included in the current frame image may be greater than the number of readout operations (e.g., capture operations) performed for generating the current frame image. For example, in FIGS. 1 and 2, the readout operations may be performed twice for obtaining the current frame image CF11 having three different exposure times E1, E2 and E3.

In some example embodiments, the first exposure time E1 may be set based on a previous frame image prior to the current frame image CF11. The previous frame image may be similarly obtained by obtaining and merging a base subframe image and a dependent subframe image during previous exposure periods of the pixels of the image sensor. For example, as with the current frame image CF11, the previous frame image may also have a plurality of exposure times, and then the first exposure time E1 may be set based on at least one of the plurality of exposure times included in the previous frame image. For example, the first exposure time E1 may be set for maintaining the resolution of the frame images (e.g., for minimizing degradation of the resolution) or set to obtain an average signal to noise ratio of the pixels that exceeds a certain minimum threshold.

In some example embodiments, the second exposure time E2 and the third exposure time E3 may be set based on the first exposure time E1. For example, each of the second exposure time E2 and the third exposure time E3 may be set by multiplying the first exposure time E1 by a predetermined value, or by adding or subtracting a predetermined time to or from the first exposure time E1.

When a single frame image is generated by combining several subframe images having different exposure times, the combined frame image may have a high or extended dynamic range. More subframe images may extend the dynamic range of the combined frame image. However, when the number of the subframe images increases, the required computations also excessively increase, and then the size of a computing circuit and/or power consumption may also be increased.

In the methods of obtaining WDR images according to example embodiments, the current frame image CF11 having a high or extended dynamic range may be generated by combining a plurality of (e.g., more than two) subframe images having different exposure times. Among the plurality of subframe images to be combined, one subframe image SF11 may have a single and the same exposure time E1 for all of the pixels of the whole region of the image sensor, and another subframe image SF21 may have different exposure times E2 and E3 for pixels of different regions of the image sensor. Accordingly, the number of the exposure times E1, E2 and E3 used to generate the current frame image CF11 may be greater than the number of the subframe images SF11 and SF21 used to generate the current frame image CF11, and thus a frame image having a relatively high or extended dynamic range may be generated with relatively low computation and low power consumption (e.g., using relatively few resources).

Figure 3:
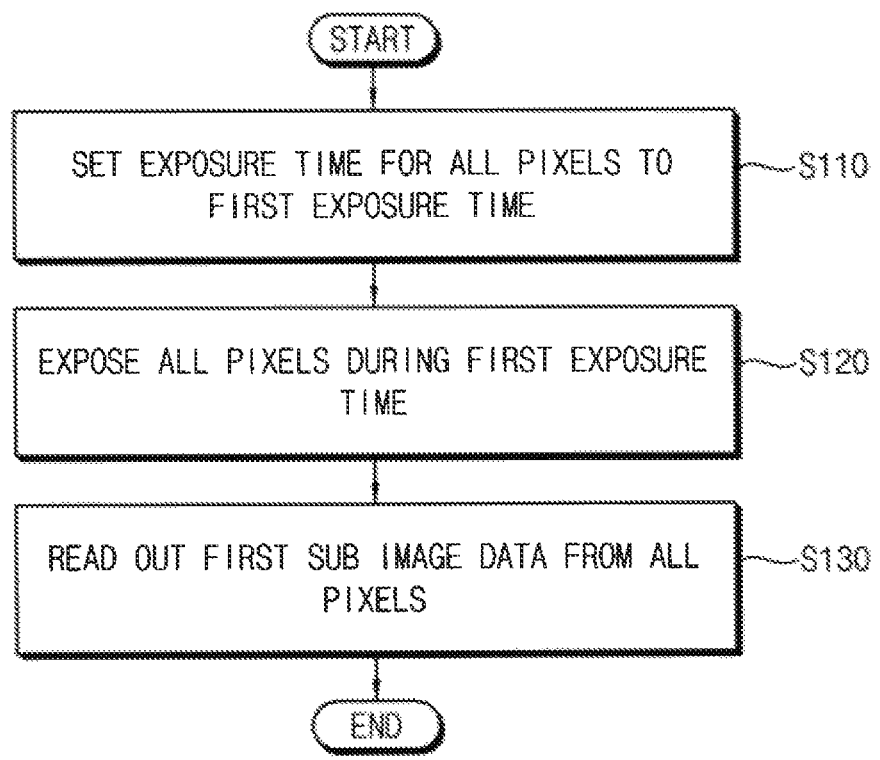
FIG. 3 is a flow chart illustrating an example of generating a first subframe image in FIG. 1.

FIG. 3 is a flow chart illustrating an example of generating a first subframe image in FIG. 1.

Referring to FIGS. 1, 2 and 3, to generate the first subframe image SF11 having the first exposure time E1 (e.g., in step S100), an exposure time for all of the plurality of pixels may be set to the first exposure time E1 (step S110). All of the plurality of pixels may be exposed during the first exposure time E1 (step S120). First sub image data corresponding to the first subframe image SF11 may be read out from all of the plurality of pixels (step S130). For example, as will be described with reference to FIG. 5A, starting points and ending points of exposing the plurality of pixels may be sequentially set by units of pixel row.

In some example embodiments, step S100 of generating the first subframe image SF11 may be performed by an image sensor (e.g., an image sensor 100 in FIG. 9), and may be performed during a first subframe period.

Figure 4:
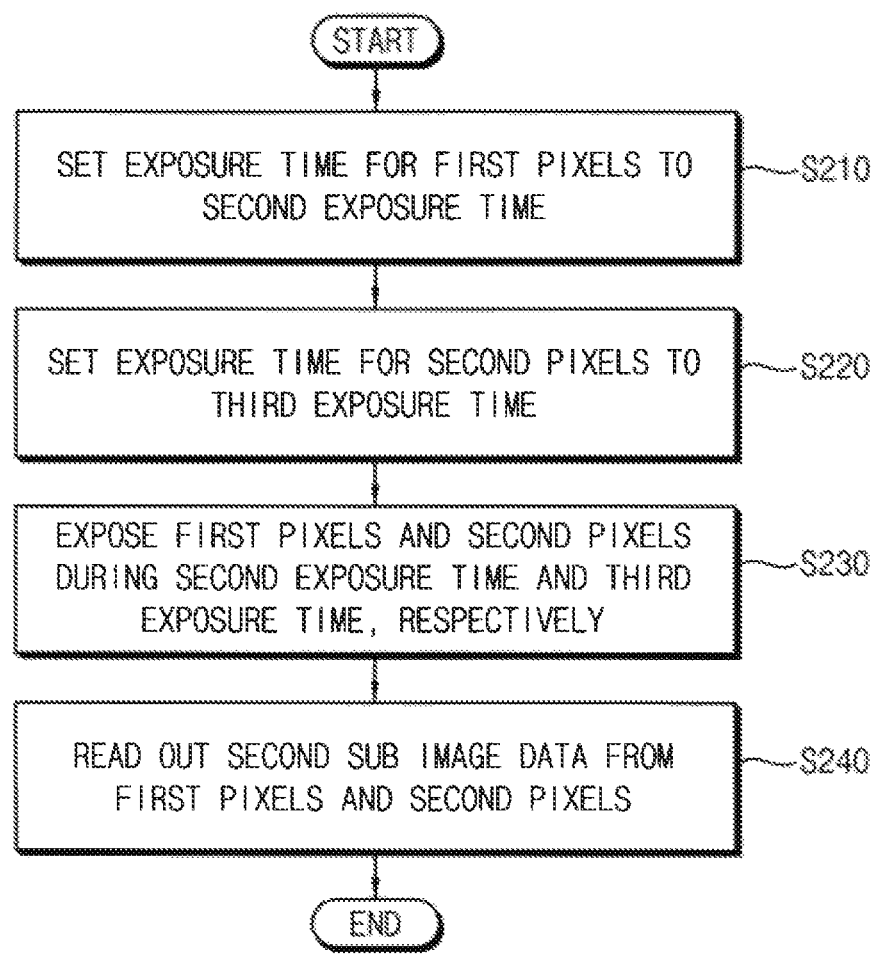
FIG. 4 is a flow chart illustrating an example of generating a second subframe image in FIG. 1.

FIG. 4 is a flow chart illustrating an example of generating a second subframe image in FIG. 1.

Referring to FIGS. 1, 2 and 4, to generate the second subframe image SF21 having the second exposure time E2 and the third exposure time E3 (e.g., in step S200), an exposure time for first pixels among the plurality of pixels may be set to the second exposure time E2 (step S210), and an exposure time for second pixels among the plurality of pixels may be set to the third exposure time E3 (step S220). The first pixels may be located in a first region in the second subframe image SF21, and the second pixels may be located in a second region in the second subframe image SF21. The first pixels and the second pixels may be exposed during the second exposure time E2 and the third exposure time E3, respectively (step S230). Second sub image data corresponding to the second subframe image SF21 may be read out from the first pixels and the second pixels (step S240). For example, as will be described with reference to FIG. 5B, ending points of exposing the plurality of pixels may be sequentially set by units of pixel row. In addition, a scheme for setting starting points of exposing the first pixels may be different from a scheme for setting starting points of exposing the second pixels such that the exposure time E2 for the first pixels is different from the exposure time E3 for the second pixels.

In some example embodiments, step S200 of generating the second subframe image SF21 may be performed by the image sensor (e.g., the image sensor 100 in FIG. 9), and may be performed during a second subframe period subsequent to the first subframe period.

Figure 5A:
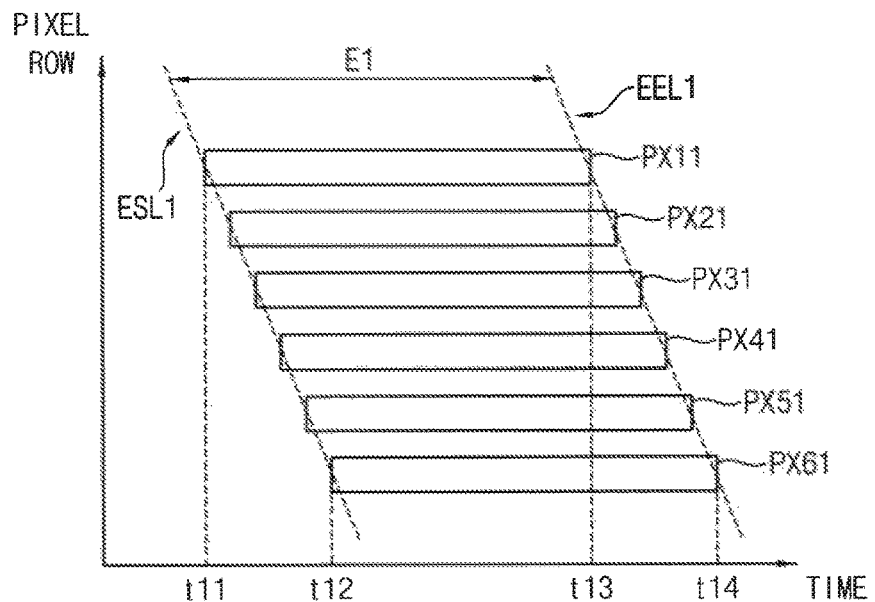
FIGS. 5A, 5B and 5C are diagrams for describing a method of obtaining a WDR image according to example embodiments.
Figure 5B:
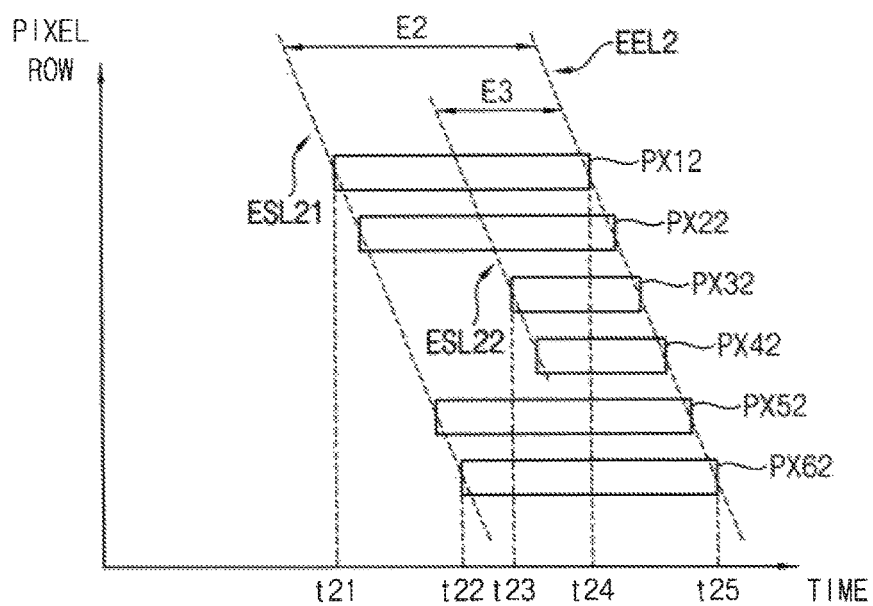
Figure 5C:
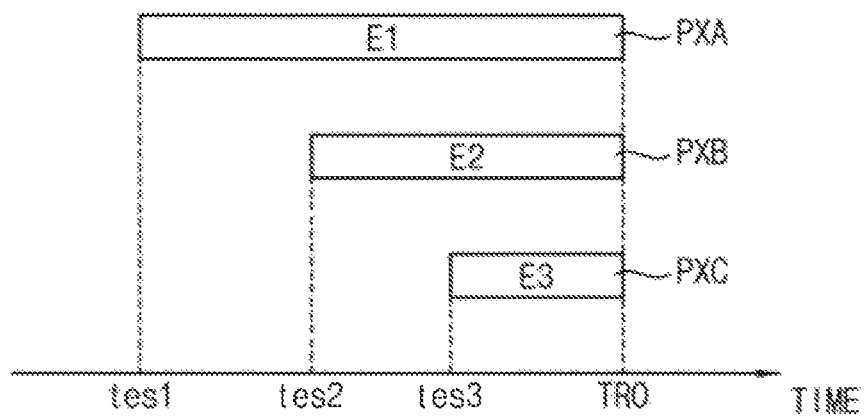

FIGS. 5A, 5B and 5C are diagrams for describing a method of obtaining a WDR image according to example embodiments. FIG. 5A is a timing diagram for describing an example of generating a first subframe image of FIG. 3. FIG. 5B is a timing diagram for describing an example of generating a second subframe image of FIG. 4. FIG. 5C illustrates an operation of setting different exposure times for pixels.

Referring to FIGS. 2, 3 and 5A, to obtain the first subframe image SF11 having the first exposure time E1 for the whole region, the exposure time for all of the plurality of pixels may be set to the first exposure time E1. For example, the plurality of pixels may include first, second, third, fourth, fifth and sixth pixels PX11, PX21, PX31, PX41, PX51 and PX61. The first through sixth pixels PX11~PX61 may be disposed in first through sixth pixel rows, respectively. For example, the first pixel PX11 may be disposed in the first pixel row, and the sixth pixel PX61 may be disposed in the sixth pixel row (e.g., a last pixel row).

The starting points and the ending points of exposing the plurality of pixels may be sequentially set by units of pixel row. For example, starting points of exposing the first through sixth pixels PX11~PX61 in the first through sixth pixel rows may be sequentially set along an exposure starting line ESL1, and ending points of exposing the first through sixth pixels PX11~PX61 in the first through sixth pixel rows may be sequentially set along an exposure ending line EEL1. The exposure starting line ESL1 and the exposure ending line EEL1 may be substantially parallel with each other. The ending points of exposing the first through sixth pixels PX11~PX61 may be substantially equal to starting points of reading out data from the first through sixth pixels PX11~PX61.

After the first exposure time E1 is set for all of the plurality of pixels, the exposure operations and the readout operations may be performed. The plurality of pixels may sequentially begin exposure and read out (e.g., may sequentially begin exposure and may sequentially terminate exposure) from the first pixel row to the last pixel row.

For example, at time t11, the first pixel PX11 in the first pixel row may begin exposure. After time t11, the second through fifth pixels PX21~PX51 in the second through fifth pixel rows may sequentially begin exposure. At time t12, the sixth pixel PX61 in the sixth pixel row may begin exposure. At time t13 at which the first exposure time E1 is elapsed from time t11, the exposure of the first pixel PX11 may be terminated, and pixel data may be read out from the first pixel PX11. After time t13, the exposure of the second through fifth pixels PX21~PX51 may be sequentially terminated, and pixel data may be sequentially read out from the second through fifth pixels PX21~PX51. At time t14 at which the first exposure time E1 is elapsed from time t12, the exposure of the sixth pixel PX61 may be terminated, and pixel data may be read out from the sixth pixel PX61.

Referring to FIGS. 2, 4 and 5B, to obtain the second subframe image SF21 having the second exposure time E2 and the third exposure time E3 for different regions, the exposure time for all of the plurality of pixels may be set. For example, the plurality of pixels may include seventh, eighth, ninth, tenth, eleventh and twelfth pixels PX12, PX22, PX32, PX42, PX52 and PX62. The seventh through twelfth pixels PX12~PX62 may be disposed in the first through sixth pixel rows, respectively. An exposure time for the seventh, eighth, eleventh and twelfth pixels PX12, PX22, PX52 and PX62 in the first, second, fifth and sixth pixel rows may be set to the second exposure time E2, and an exposure time for the ninth and tenth pixels PX32 and PX42 in the third and fourth pixel rows may be set to the third exposure time E3.

The ending points of exposing the plurality of pixels may be sequentially set by units of pixel row. For example, ending points of exposing the seventh through twelfth pixels PX12~PX62 in the first through sixth pixel rows may be sequentially set along an exposure ending line EEL2. To set different exposure times for the plurality of pixels, the different starting points of exposing the plurality of pixels may be set. For example, starting points of exposing the seventh, eighth, eleventh and twelfth pixels PX12, PX22, PX52 and PX62 (e.g., pixels having a relatively long exposure time) may be sequentially set along a first exposure starting line ESL21, and starting points of exposing the ninth and tenth pixels PX32 and PX42 (e.g., pixels having a relatively short exposure time) may be sequentially set along a second exposure starting line ESL22. The exposure starting lines ESL21 and ESL22 and the exposure ending line EEL2 may be substantially parallel with one another.

After the second exposure time E2 and the third exposure time E3 are set for all of the plurality of pixels, the exposure operations and the readout operations may be performed. The plurality of pixels may begin sequential read out (e.g., may sequentially terminate exposure) from the first pixel row to the last pixel row, however, may not sequentially begin exposure from the first pixel row to the last pixel row.

For example, at time t21, the seventh pixel PX12 in the first pixel row may begin exposure. After time t21, the eighth and eleventh pixels PX22 and PX52 in the second and fifth pixel rows may sequentially begin exposure. At time t22, the twelfth pixel PX62 in the sixth pixel row may begin exposure. The ninth pixel PX32 in the third pixel row may begin exposure at time t23, and the tenth pixel PX42 in the fourth pixel row may begin exposure after time t23. At time t24 at which the second exposure time E2 is elapsed from time t21, the exposure of the seventh pixel PX12 may be terminated, and pixel data may be read out from the seventh pixel PX12. After time t24, the exposure of the eighth through eleventh pixels PX22~PX52 may be sequentially terminated, and pixel data may be sequentially read out from the eighth through eleventh pixels PX22~PX52. For example, pixel data may be read out from the ninth pixel PX32 at the time point at which the third exposure time E3 is elapsed from time t23. At time t25 at which the second exposure time E2 is elapsed from time t22, the exposure of the twelfth pixel PX62 may be terminated, and pixel data may be read out from the twelfth pixel PX62.

Although operations of FIGS. 5A and 5B are described based on a single pixel in each pixel row, pixels in a single pixel row may equally operate when the pixels in the single pixel row have the same exposure time (e.g., in the example of FIG. 2). In an example of obtaining the first subframe image SF11, operations of pixels in the first pixel row may be substantially the same as the operation of the first pixel PX11 in FIG. 5A. In an example of obtaining the second subframe image SF21, operations of pixels in the first pixel row may be substantially the same as the operation of the seventh pixel PX12 in FIG. 5B.

Although FIGS. 2, 5A and 5B illustrate an example where a single frame image includes six pixel rows and has a size of 6*8 pixels, the number of pixel rows and pixels in a single frame image may vary according to example embodiments.

Referring to FIG. 5C, ending points TR0 of exposing pixels PXA, PXB and PXC in the same pixel row (or starting points of reading out pixel data from the pixels PXA, PXB and PXC in the same pixel row) may be substantially the same as one another. To set different exposure times E1, E2 and E3 for the pixels PXA, PXB and PXC in the same pixel row, a starting point tes1 of exposing the pixel PXA, a starting point tes2 of exposing the pixel PXB and a starting point tes3 of exposing the pixel PXC may be set to be different from one another.

In some example embodiments, as illustrated in FIGS. 5A, 5B and 5C, the second exposure time E2 may be shorter than the first exposure time E1, and the third exposure time E3 may be shorter than the second exposure time E2. For example, the second exposure time E2 may be set by multiplying the first exposure time E1 by a reference value, and the third exposure time E3 may be set by multiplying the second exposure time E2 by the reference value. For example, the reference value may be greater than zero and less than one.

In other example embodiments, although not illustrated in FIGS. 5A, 5B and 5C, the second exposure time may be longer than the first exposure time, and the third exposure time may be shorter than the first exposure time. For example, the second exposure time may be set by adding a reference time to the first exposure time, and the third exposure time may be set by subtracting the reference time from the first exposure time.

In still other example embodiments, the first exposure time, the second exposure time and the third exposure time may vary according to example embodiments.

Figure 6:
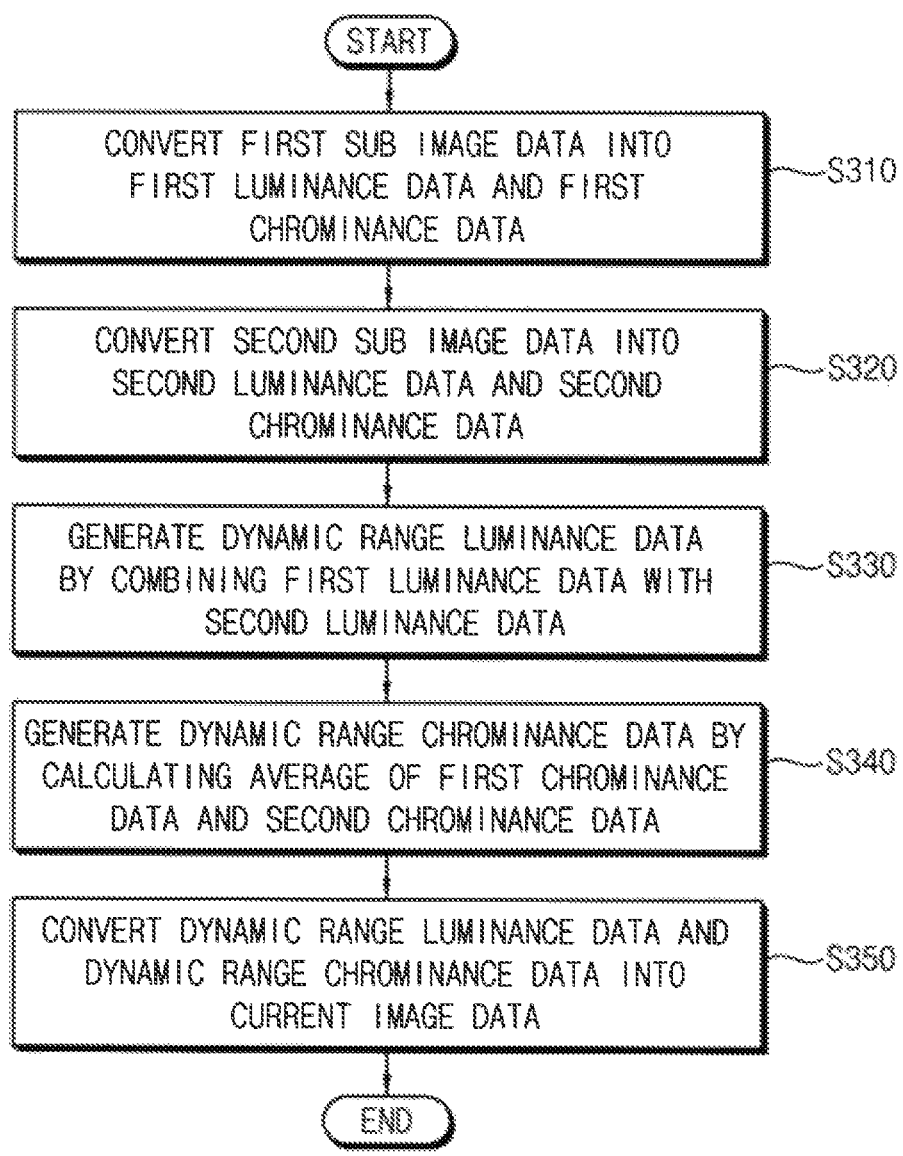
FIG. 6 is a flow chart illustrating an example of generating a current frame image in FIG. 1.

FIG. 6 is a flow chart illustrating an example of generating a current frame image in FIG. 1.

Referring to FIGS. 1, 2 and 6, to generate the current frame image CF11 having the first exposure time E1, the second exposure time E2 and the third exposure time E3 (e.g., in step S300), the first sub image data corresponding to the first subframe image SF11 may be converted into first luminance data and first chrominance data (step S310). The second sub image data corresponding to the second subframe image SF21 may be converted into second luminance data and second chrominance data (step S320). Luminance data may represent a detected intensity of the pixel as reflected by the intensity data collected by sub-pixels (e.g., red, green and blue sub-pixels) of the pixel.

Dynamic range luminance data may be generated by combining the first luminance data with the second luminance data (step S330). For example, a maximum luminance value and a minimum luminance value of each pixel may be calculated based on the first luminance data and the second luminance data. The dynamic range luminance data may be calculated by compensating and composing the first luminance data and the second luminance data based on the maximum luminance value and the minimum luminance value. For example, small size images that are downscaled from the first and second subframe images SF11 and SF21 may be used for calculating the maximum luminance value and the minimum luminance value.

Dynamic range chrominance data may be generated by calculating an average of the first chrominance data and the second chrominance data (step S340).

The dynamic range luminance data and the dynamic range chrominance data may be converted into current image data corresponding to the current frame image CF11 (step S350). For example, the current image data may be obtained by converting the dynamic range luminance data and the dynamic range chrominance data into red, green and blue (RGB) data.

As described above, when image data is divided into luminance data and chrominance data to perform a WDR technology (e.g., when the current image data is generated based on luminance data and chrominance data), the complexity of computation hardware may be reduced, and the color imbalance caused by adjusting red, green and blue components may be reduced.

In some example embodiments, step S300 of generating the current frame image CF11 may be performed by an image signal processor (e.g., ISP 200 in FIG. 19), and may be performed during a WDR processing period subsequent to the first and second subframe periods.

Although not illustrated in FIG. 6, the current image data may not be generated based on luminance data and chrominance data, but may be generated based on RGB data without data conversion (e.g., without dividing image data into luminance data and chrominance data) according to example embodiments.

Figure 7:
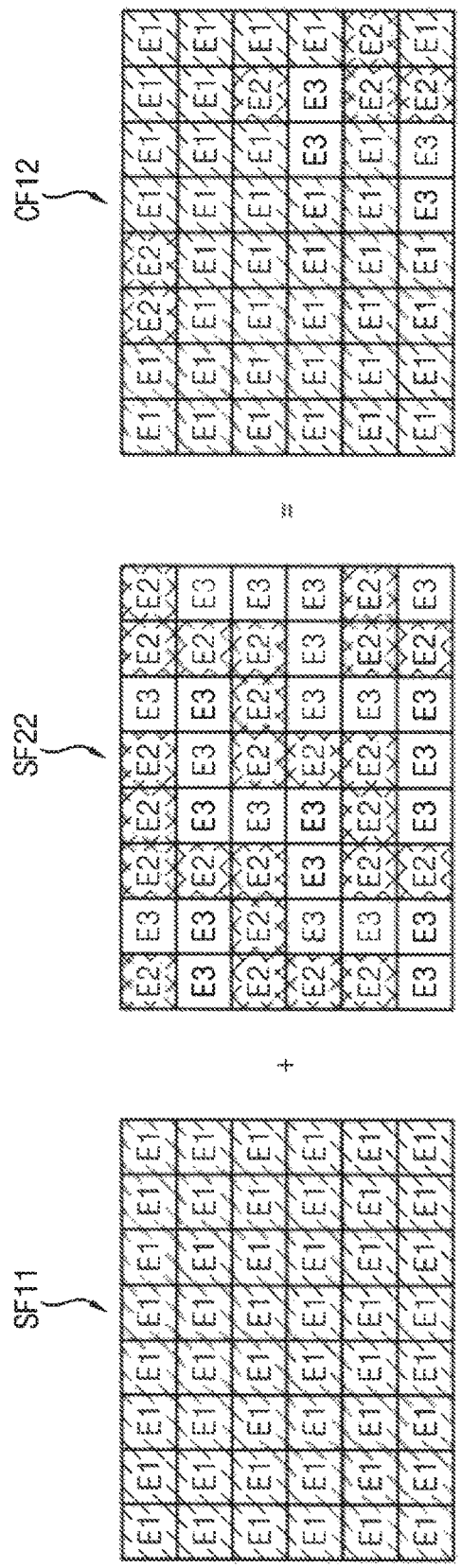
FIGS. 7 and 8 are diagrams for describing a method of obtaining a WDR image according to example embodiments.
Figure 8:
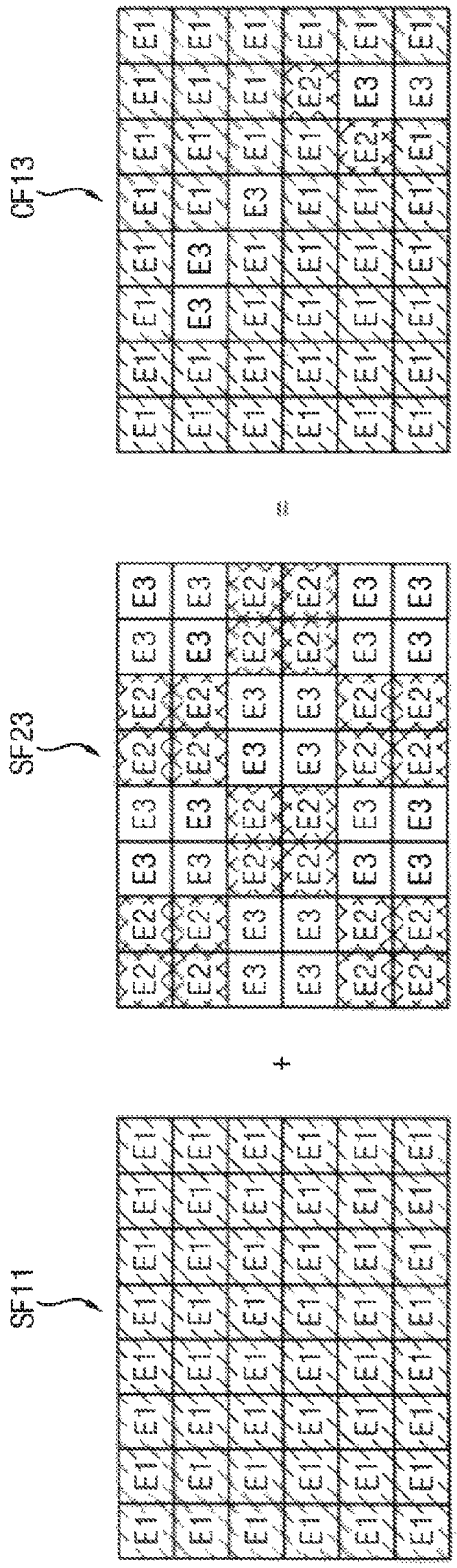

FIGS. 7 and 8 are diagrams for describing a method of obtaining a WDR image according to example embodiments.

Referring to FIG. 7, a current frame image CF12 having a first exposure time E1, a second exposure time E2 and a third exposure time E3 is generated by combining a first subframe image SF11 having the first exposure time E1 with a second subframe image SF22 having the second exposure time E2 and the third exposure time E3.

In an example of FIG. 7, a first region and a second region in the second subframe image SF22 may be formed in zigzag shapes or step shapes. In other words, each of the first and second regions in the second subframe image SF22 may be scalariformly arranged or disposed along a first diagonal direction from upper right to lower left, and the first and second regions in the second subframe image SF22 may be alternately arranged or disposed along a second diagonal direction from upper left to lower right. The first region in the second subframe image SF22 may correspond to the second exposure time E2, and the second region in the second subframe image SF22 may correspond to the third exposure time E3.

Referring to FIG. 8, a current frame image CF13 having a first exposure time E1, a second exposure time E2 and a third exposure time E3 is generated by combining a first subframe image SF11 having the first exposure time E1 with a second subframe image SF23 having the second exposure time E2 and the third exposure time E3.

In an example of FIG. 8, a first region and a second region in the second subframe image SF23 may be formed in a checkerboard pattern. In other words, the first and second regions in the second subframe image SF23 may be alternately arranged or disposed along a vertical direction (e.g., a direction from top to bottom) and a horizontal direction (e.g., a direction from left to right). The first region in the second subframe image SF23 may correspond to the second exposure time E2, and the second region in the second subframe image SF23 may correspond to the third exposure time E3.

In some example embodiments, the second subframe image SF22 in FIG. 7 and the second subframe image SF23 in FIG. 8 may be generated based on the operations described with reference to FIGS. 5B and 5C.

Figure 9:
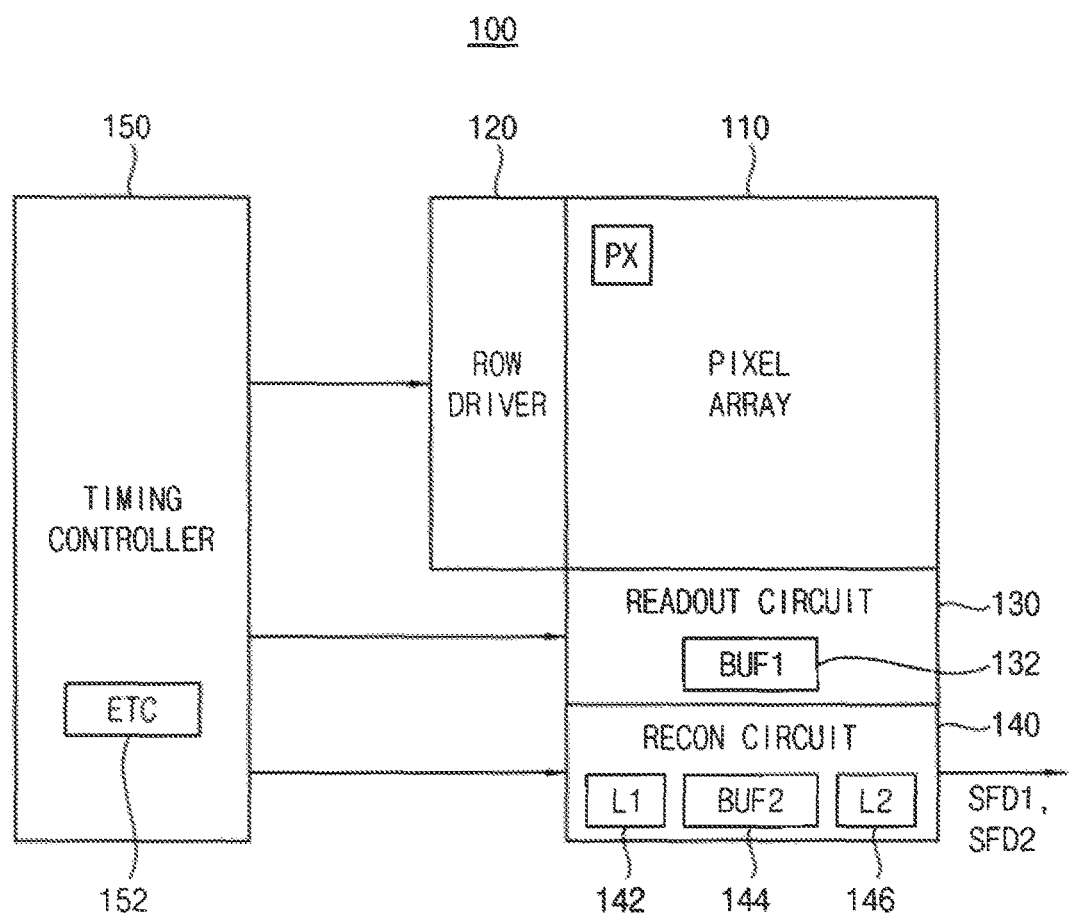
FIG. 9 is a block diagram illustrating an image sensor included in an image pickup device according to example embodiments.

FIG. 9 is a block diagram illustrating an image sensor included in an image pickup device according to example embodiments.

Referring to FIG. 9, an image sensor 100 includes a pixel array 110 and a signal processing circuit. The signal processing circuit may include a row driver 120, a readout circuit 130, a reconstruction (RECON) circuit 140 and a timing controller 150.

The pixel array 110 generates a plurality of pixel signals (e.g., analog pixel signals) based on incident light. The pixel array 110 includes a plurality of pixels PX that are arranged in a matrix of a plurality of rows and a plurality of columns. Each of the plurality of pixels PX may include a photoelectric conversion unit and a signal generating unit. The photoelectric conversion unit may generate and collect photocharges based on the incident light. For example, the photoelectric conversion unit may include a photodiode, a phototransistor, a photo gate, a pinned photodiode (PPD) and/or a combination thereof, each of which may generate charge (e.g., a photocurrent) in proportion to an intensity to and an exposure time to a light source. The signal generating unit may generate the pixel signal based on the photocharges generated and collected during the exposure period for each pixel. For example, a pixel structure may be defined based on the number of transistors included in the signal generating unit.

The timing controller 150 controls the row driver 120, the readout circuit 130 and the reconstruction circuit 140. For example, the timing controller 150 may provide control signals, such as a clock signal, a timing control signal, or the like, to the row driver 120, the readout circuit 130 and/or the reconstruction circuit 140.

The timing controller 150 may include an exposure time control unit (ETC) 152 that sets an exposure time for the plurality of pixels PX. For example, the exposure time control unit 152 may set an exposure time for all of the plurality of pixels PX to the first exposure time E1 during a first subframe period for generating a first subframe image. The exposure time control unit 152 may set an exposure time for first pixels and second pixels among the plurality of pixels PX to the second exposure time E2 and the third exposure time E3, respectively, during a second subframe period for generating a second subframe image. For example, the exposure time control unit 152 may set the exposure time for the plurality of pixels PX based on a control of an image signal processor (e.g., the image signal processor 200 in FIG. 19).

In some example embodiments, as described with reference to FIGS. 5B and 5C, the exposure time control unit 152 may set different exposure times for the plurality of pixels PX by setting different starting points of exposing the plurality of pixels PX. In other example embodiments, although not illustrated in FIGS. 5B and 5C, the exposure time control unit 152 may set different exposure times for the plurality of pixels PX based on a physical pattern. For example, the different exposure times for the plurality of pixels PX may be set by temporarily arranging or disposing the physical pattern on the pixel array 110. For example, the physical pattern may have a shape that is similar to one of the subframe images SF21, SF22 and SF23 in FIGS. 2, 7 and 8.

The row driver 120 is connected to the plurality of rows of the pixel array 110. The row driver 120 may generate driving signals to drive the plurality of rows. For example, the row driver 120 may drive the plurality of pixels PX included in the pixel array 110 by units of pixel row.

The readout circuit 130 is connected to the plurality of columns of the pixel array 110. The readout circuit 130 may read out the plurality of pixel signals from the pixel array 110 by units of pixel row. For example, the readout circuit 130 may include an analog-to-digital converter (ADC) and a correlated double sampling (CDS) circuit. The ADC may convert analog signals (e.g., the pixel signals) from the pixel array 110 into digital signals (e.g., digital image signals). The CDS circuit may extract an effective signal component based on a difference between a reset signal including a reset component and an image signal including a signal component. For example, the CDS circuit may perform an analog double sampling, a digital double sampling or a dual CDS that performs both the analog double sampling and the digital double sampling.

The readout circuit 130 may read out image data (e.g., first sub image data SFD1) corresponding to the first subframe image by units of pixel row during the first subframe period, and may read out image data (e.g., second sub image data SFD2) corresponding to the second subframe image by units of pixel row during the second subframe period. The readout circuit 130 may include a first buffer (BUF1) 132 that store line data read out by units of pixel row. For example, the first buffer 132 may include two line memories for two sub image data SFD1 and SFD2.

In some example embodiments, the first and second subframe periods may partially overlap each other. For example, each of the first and second subframe periods may include an exposure period and a readout period, and a readout period of the first subframe period may overlap a readout period of the second subframe period.

In some example embodiments, the first sub image data SFD1 and the second sub image data SFD2 may be alternately read out. A predetermined number of a plurality of first line image data, included in the first sub image data SFD1, and a plurality of second line image data, included in the second sub image data SFD2, may be alternately read out. For example, some of the plurality of first line image data may be read out, and then some of the plurality of second line image data may be read out, and then other of the plurality of first line image data may be read out, and then other of the plurality of second line image data may be read out. The readout operation described above may be referred to as a line-interleaved readout scheme.

The reconstruction circuit 140 is connected to the readout circuit 130. The reconstruction circuit 140 may generate the first sub image data SFD1 by combining the plurality of first line image data with one another and may generate the second sub image data SFD2 by combining the plurality of second line image data with one another. The reconstruction circuit 140 may include a first logic circuit (L1) 142, a second buffer (BUF2) 144 and a second logic circuit (L2) 146.

The first logic circuit 142 may perform an interpolating operation and a merging operation on the plurality of second line image data. By interpolating and merging a plurality of pixel data having different exposure times, a display defect such as a motion artifact may be reduced or mitigated.

The second buffer 144 may perform a re-ordering operation on the plurality of first line image data and the plurality of second line image data, respectively. For example, the second buffer 144 may sequentially store the plurality of first line image data from a first pixel row to a last pixel row, and may sequentially store the plurality of second line image data from a first pixel row to a last pixel row. For example, the second buffer 144 may include two line memories and/or two frame memories for two sub image data SFD1 and SFD2.

The second logic circuit 146 may generate the first sub image data SFD1 by merging and combining the plurality of re-ordered first line image data, and may generate the second subframe image SFD2 by merging and combining the plurality of re-ordered second line image data.

Figure 10:
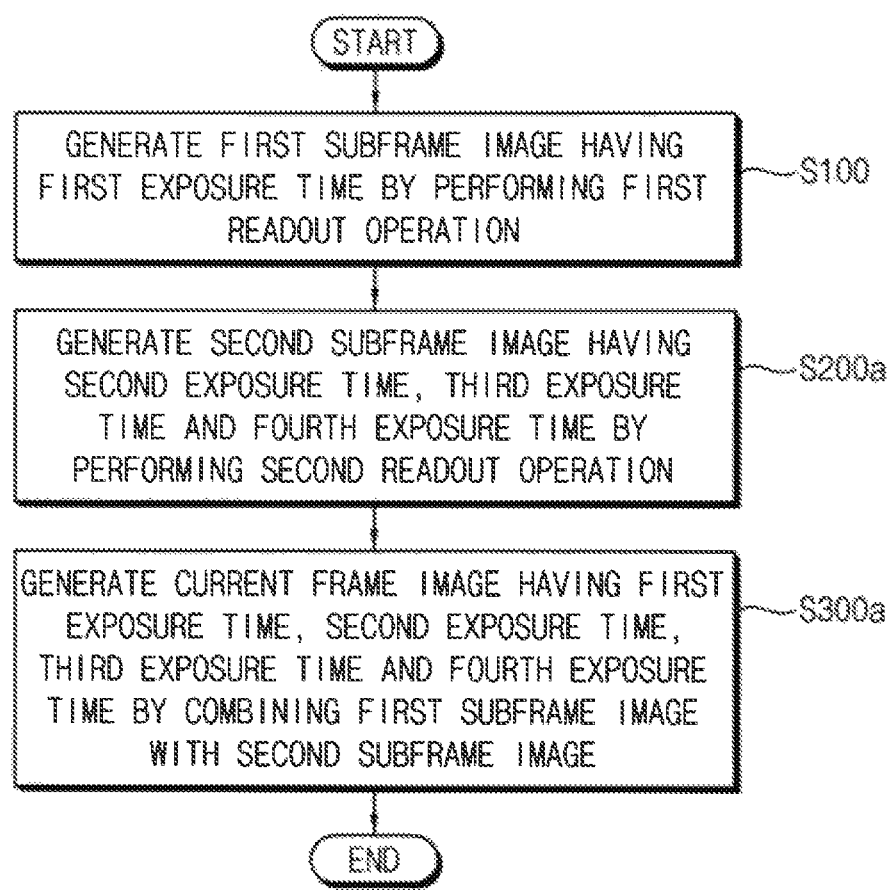
FIG. 10 is a flow chart illustrating a method of obtaining a WDR image according to example embodiments.
Figure 11:
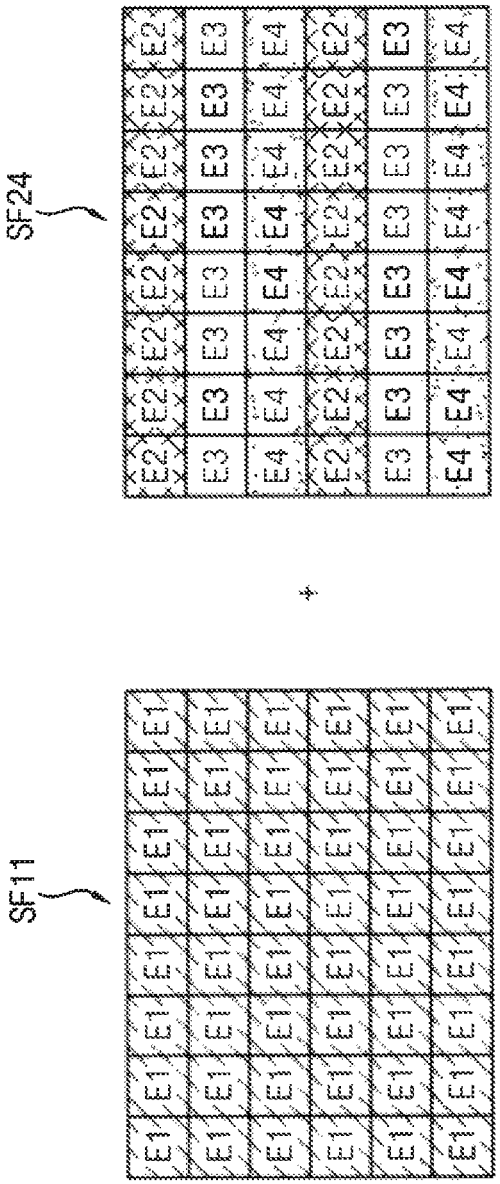
FIG. 11 is a diagram for describing a method of obtaining a WDR image according to example embodiments.

FIG. 10 is a flow chart illustrating a method of obtaining a WDR image according to example embodiments. FIG. 11 is a diagram for describing a method of obtaining a WDR image according to example embodiments. FIG. 11 illustrates arrangements of exposure times in the subframe images.

Referring to FIGS. 10 and 11, in a method of obtaining a WDR image according to example embodiments, a first subframe image SF11 having a first exposure time E1 is generated by performing a first readout operation on all of a plurality of pixels (step S100). Step S100 in FIG. 10 may be substantially the same as step S100 in FIG. 1.

A second subframe image SF24 having a second exposure time E2, a third exposure time E3 and a fourth exposure time E4 is generated by performing a second readout operation on all of the plurality of pixels (step S200a). The first exposure time E1, the second exposure time E2, the third exposure time E3 and the fourth exposure time E4 are different from one another. Step S200a in FIG. 10 may be substantially the same as step S200 in FIG. 1, except that the second subframe image SF24 further has an additional exposure time (e.g., the fourth exposure time E4).

In an example of FIG. 11, a first region, a second region and a third region in the second subframe image SF24 may be formed in horizontal stripes. The first region in the second subframe image SF24 may correspond to the second exposure time E2, the second region in the second subframe image SF24 may correspond to the third exposure time E3, and the third region in the second subframe image SF24 may correspond to the fourth exposure time E4. Although not illustrated in FIG. 11, the first region, the second region and the third region in the second subframe image may be formed in zigzag shapes as illustrated in FIG. 7 or may be formed in a checkerboard pattern as illustrated in FIG. 8.

A current frame image (not shown) having the first exposure time E1, the second exposure time E2, the third exposure time E3 and the fourth exposure time E4 is generated by combining the first subframe image SF11 with the second subframe image SF24 (step S300a). In an example of FIGS. 10 and 11, the readout operations may be performed twice for obtaining the current frame image having four different exposure times E1, E2, E3 and E4.

As described above with reference to FIG. 1, the first exposure time E1 may be set based on a previous frame image, and the second exposure time E2, the third exposure time E3 and the fourth exposure time E4 may be set based on the first exposure time E1.

Figure 12:
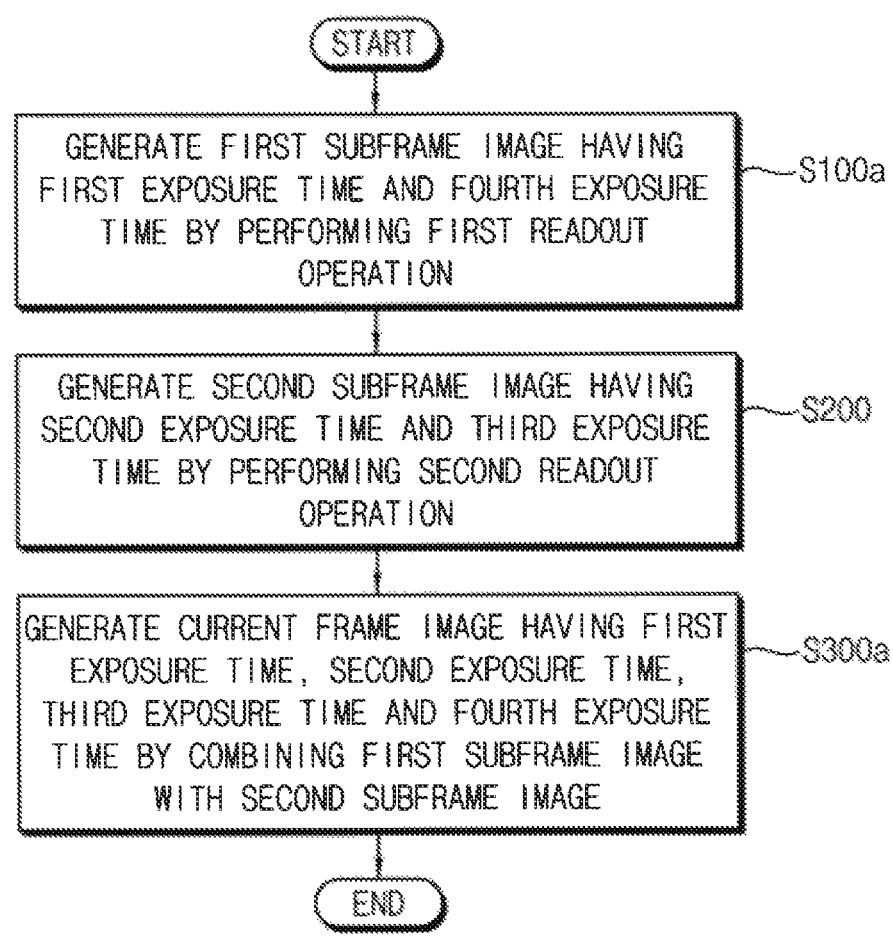
FIG. 12 is a flow chart illustrating a method of obtaining a WDR image according to example embodiments.
Figure 13:
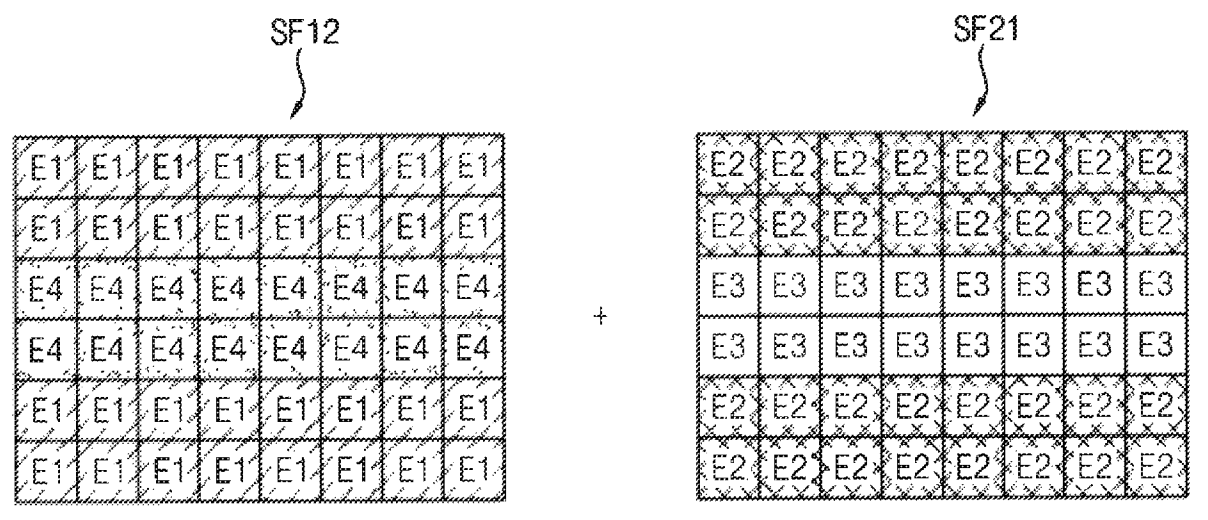
Figure 14:
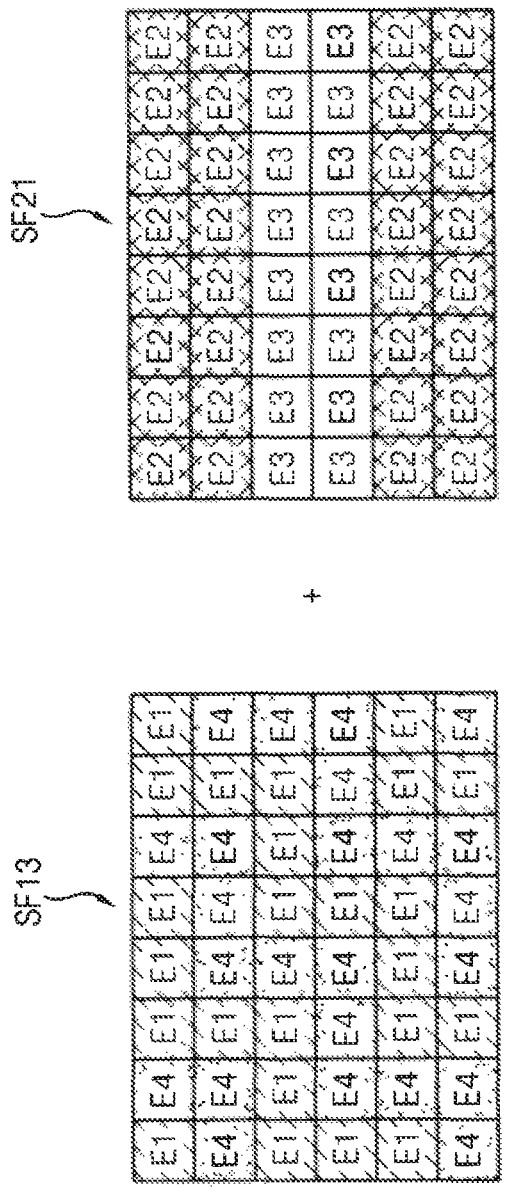
Figure 15:
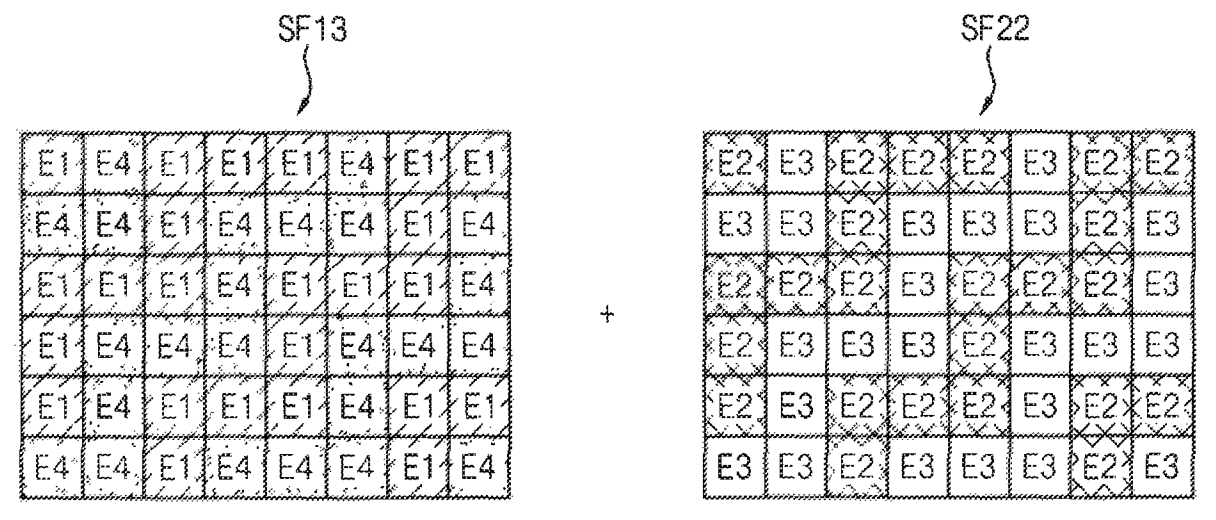

FIG. 12 is a flow chart illustrating a method of obtaining a WDR image according to example embodiments. FIGS. 13, 14 and 15 are diagrams for describing a method of obtaining a WDR image according to example embodiments.

Referring to FIGS. 12 and 13, in a method of obtaining a WDR image according to example embodiments, a first subframe image SF12 having a first exposure time E1 and a fourth exposure time E4 is generated by performing a first readout operation on all of a plurality of pixels (step S100a). A second subframe image SF21 having a second exposure time E2 and a third exposure time E3 is generated by performing a second readout operation on all of the plurality of pixels (step S200). The first exposure time E1, the second exposure time E2, the third exposure time E3 and the fourth exposure time E4 are different from one another.

In an example of FIG. 12, both the first subframe image SF12 and the second subframe image SF21 may be the pixel-level multi-exposure frame. In this example, the first logic circuit 142 in the image sensor 100 of FIG. 9 may further perform an interpolating operation and a merging operation on a plurality of first line image data corresponding to the first subframe image SF12.

Step S200 in FIG. 12 may be substantially the same as step S200 in FIG. 1, and step S100a in FIG. 12 may be similar to step S200 in FIG. 1

A current frame image having the first exposure time E1, the second exposure time E2, the third exposure time E3 and the fourth exposure time E4 is generated by combining the first subframe image SF12 with the second subframe image SF21 (step S300a). In an example of FIGS. 12 and 13, the readout operations may be performed twice for obtaining the current frame image having four different exposure times E1, E2, E3 and E4.

In some example embodiments, the first exposure time E1 and the fourth exposure time E4 may be set based on a previous frame image, and the second exposure time E2 and the third exposure time E3 may be set based on at least one of the first exposure time E1 and the fourth exposure time E4.

In some example embodiments, as illustrated in FIG. 13, a first exposure pattern of the first subframe image SF12 may be substantially the same as a second exposure pattern of the second subframe image SF21. The first exposure pattern may represent an arrangement of a first region corresponding to the first exposure time E1 and a second region corresponding to the fourth exposure time E4 in the first subframe image SF12. The second exposure pattern may represent an arrangement of a third region corresponding to the second exposure time E2 and a fourth region corresponding to the third exposure time E3 in the second subframe image SF21.

Referring to FIG. 14, a current frame image (not shown) having a first exposure time E1, a second exposure time E2, a third exposure time E3 and a fourth exposure time E4 is generated by combining a first subframe image SF13 having the first exposure time E1 and the fourth exposure time E4 with a second subframe image SF21 having the second exposure time E2 and the third exposure time E3. In an example of FIG. 14, a first exposure pattern of the first subframe image SF13 may be different from a second exposure pattern of the second subframe image SF21. The first exposure pattern may represent an arrangement of a first region corresponding to the first exposure time E1 and a second region corresponding to the fourth exposure time E4 in the first subframe image SF13. The second exposure pattern may represent an arrangement of a third region corresponding to the second exposure time E2 and a fourth region corresponding to the third exposure time E3 in the second subframe image SF21.

Referring to FIG. 15, a current frame image (not shown) having a first exposure time E1, a second exposure time E2, a third exposure time E3 and a fourth exposure time E4 is generated by combining a first subframe image SF13 having the first exposure time E1 and the fourth exposure time E4 with a second subframe image SF22 having the second exposure time E2 and the third exposure time E3. In an example of FIG. 15, a first exposure pattern of the first subframe image SF13 may be substantially the same as a second exposure pattern of the second subframe image SF22. The first exposure pattern may represent an arrangement of a first region corresponding to the first exposure time E1 and a second region corresponding to the fourth exposure time E4 in the first subframe image SF13. The second exposure pattern may represent an arrangement of a third region corresponding to the second exposure time E2 and a fourth region corresponding to the third exposure time E3 in the second subframe image SF22.

Figure 16:
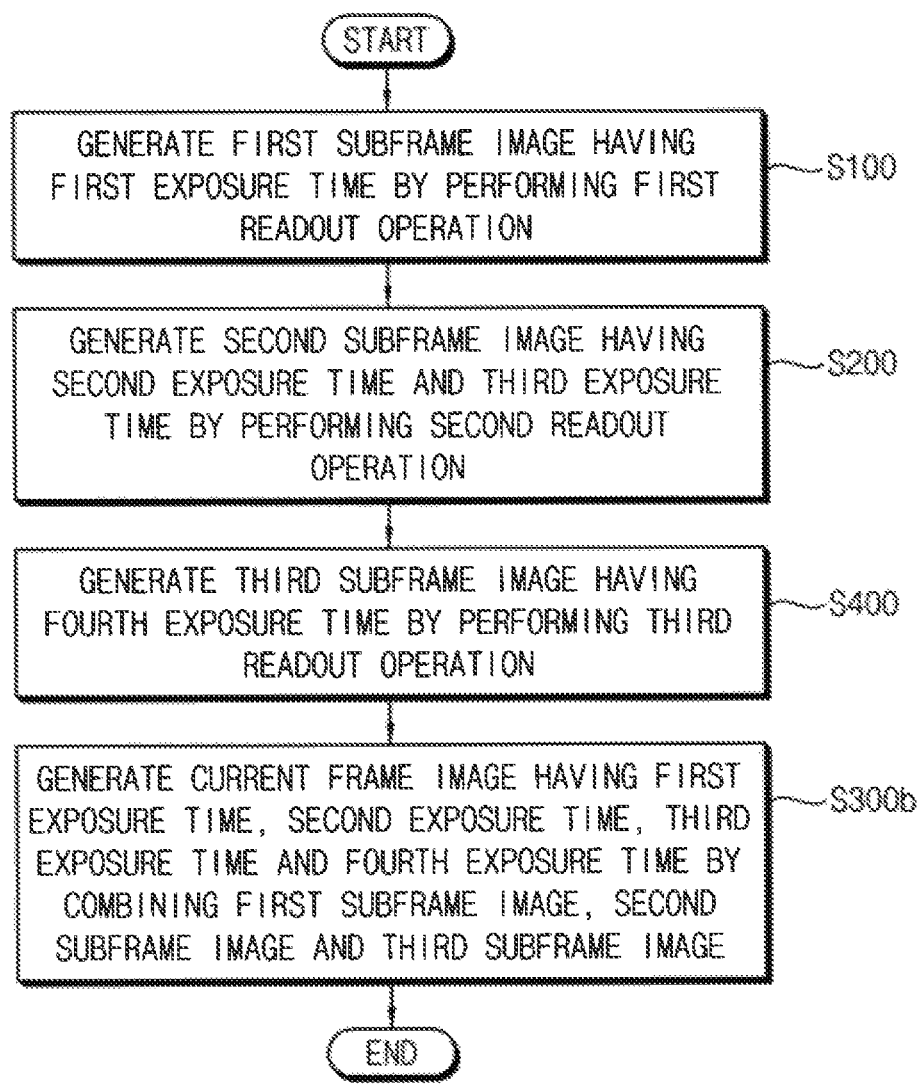
FIG. 16 is a flow chart illustrating a method of obtaining a WDR image according to example embodiments.
Figure 17:
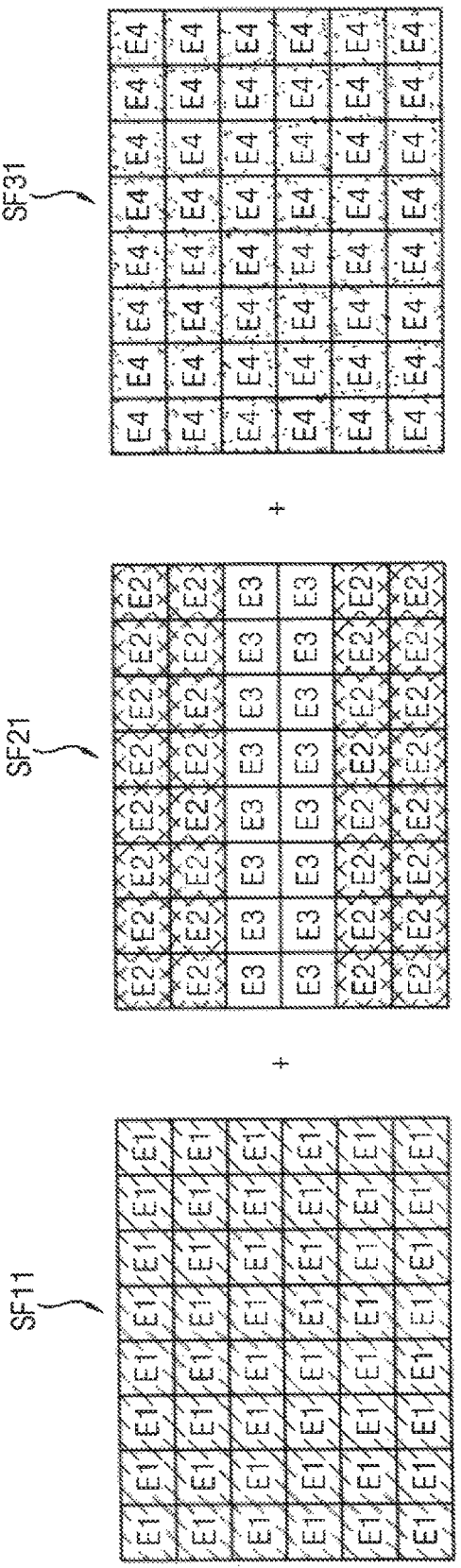
Figure 18:
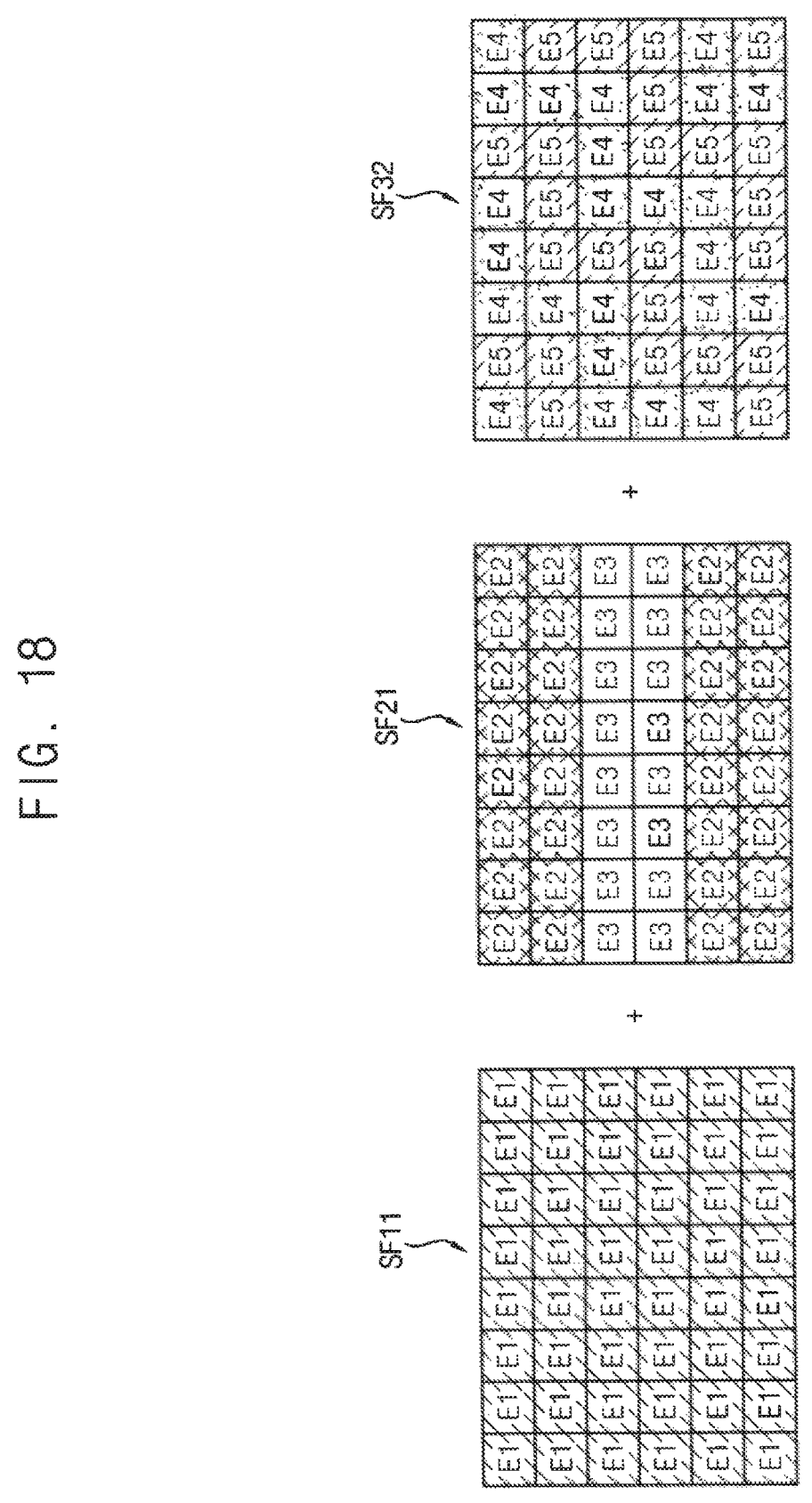

FIG. 16 is a flow chart illustrating a method of obtaining a WDR image according to example embodiments. FIGS. 17 and 18 are diagrams for describing a method of obtaining a WDR image according to example embodiments.

Referring to FIGS. 16 and 17, in a method of obtaining a WDR image according to example embodiments, a first subframe image SF11 having a first exposure time E1 is generated by performing a first readout operation on all of a plurality of pixels (step S100). A second subframe image SF21 having a second exposure time E2 and a third exposure time E3 is generated by performing a second readout operation on all of the plurality of pixels (step S200). A third subframe image SF31 having a fourth exposure time E4 is generated by performing a third readout operation on all of the plurality of pixels (step S400). The first exposure time E1, the second exposure time E2, the third exposure time E3 and the fourth exposure time E4 are different from one another. Steps S100 and S200 in FIG. 16 may be substantially the same as steps S100 and S200 in FIG. 1, respectively. Step S400 in FIG. 16 may be similar to step S100 in FIG. 1.

A current frame image having the first exposure time E1, the second exposure time E2, the third exposure time E3 and the fourth exposure time E4 is generated by combining the first subframe image SF11, the second subframe image SF21 and the third subframe image SF31 (step S300b). In an example of FIGS. 16 and 17, the readout operations may be performed three times for obtaining the current frame image having four different exposure times E1, E2, E3 and E4. In this example, each of the first and second buffers 132 and 144 in the image sensor 100 of FIG. 9 may further include an additional memory for the third subframe image SF31.

In some example embodiments, the first exposure time E1 may be set based on a previous frame image, and the second exposure time E2, the third exposure time E3 and the fourth exposure time E4 may be set based on the first exposure time E1.

In some example embodiments, as illustrated in FIG. 17, a first exposure pattern of the first subframe image SF11 may be different from a second exposure pattern of the second subframe image SF21, and a third exposure pattern of the third subframe image SF31 may be substantially the same as one of the first exposure pattern and the second exposure pattern.

Referring to FIG. 18, a current frame image (not shown) having a first exposure time E1, a second exposure time E2, a third exposure time E3, a fourth exposure time E4 and a fifth exposure time E5 is generated by combining a first subframe image SF11 having the first exposure time E1, the second subframe image SF21 having the second exposure time E2 and the third exposure time E3 and the third subframe image SF32 having the fourth exposure time E4 and the fifth exposure time E5. In an example of FIG. 18, a first exposure pattern of the first subframe image SF11, a second exposure pattern of the second subframe image SF21 and a third exposure pattern of the third subframe image SF33 may be different from one another.

The method of obtaining the WDR image according to example embodiments may be applied or employed to any example where the number of exposure times included in a current frame image may be greater than the number of subframe images (e.g., the number of readout operations) when the current frame image is generated by combining the subframe images having different exposure times.

As will be appreciated by those skilled in the art, the present disclosure may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

Figure 19:
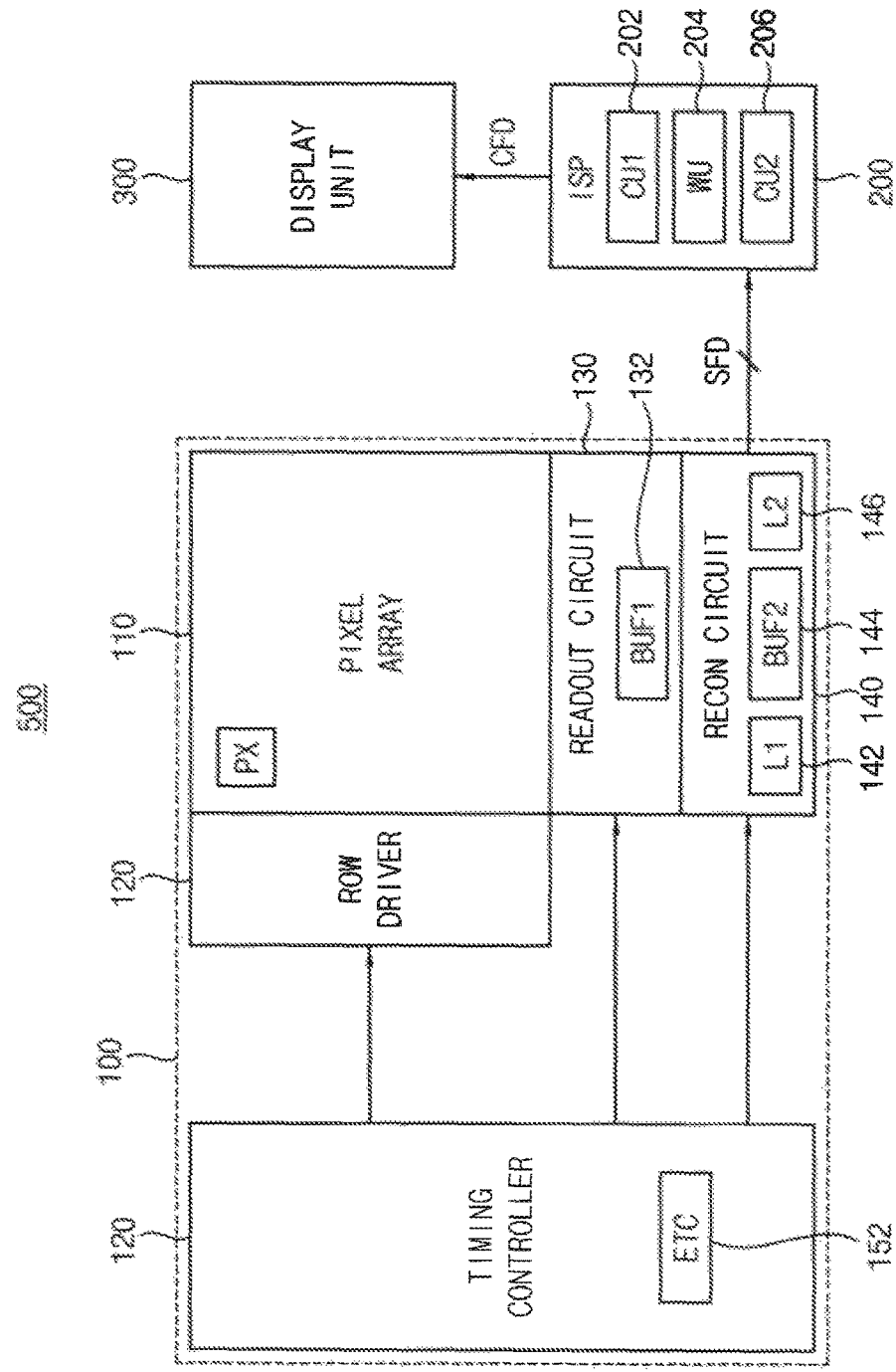
FIG. 19 is a block diagram illustrating an image pickup device according to example embodiments.

FIG. 19 is a block diagram illustrating an image pickup device according to example embodiments.

Referring to FIG. 19, an image pickup device 500 includes an image sensor 100 and an image signal processor (ISP) 200. The image pickup device 500 may further include a display unit 300.

The image sensor 100 in FIG. 19 may be substantially the same as the image sensor 100 of FIG. 9. The image sensor 100 may set different exposure times for the plurality of pixels PX, may generate a plurality of subframe images having different exposure times, and may generate a plurality of sub image data SFD corresponding to the plurality of subframe images. The number of the subframe images (e.g., the number of readout operations for the plurality of pixels PX) may be less than the total number of exposure times included in the subframe images. For example, the number of memories included in each of the first and second buffers 132 and 144 may be substantially the same as the number of the subframe images, and the first logic circuit 142 may perform an interpolating operation and a merging operation on the pixel-level multi-exposure frame.

The image signal processor 200 may generate a current frame image by combining the plurality of subframe images such that the number of exposure times included in the current frame image is greater than the number of the subframe images. The image signal processor 200 may output current image data CFD corresponding to the current frame image. The image signal processor 200 may perform step S100 in FIG. 1 and steps S310, S320, S330, S340 and S350 in FIG. 6.

The image signal processor 200 may include a first conversion unit (CU1) 202, a WDR unit (WU) 204 and a second conversion unit (CU2) 206. The first conversion unit 202 may convert the plurality of sub image data SFD into a plurality of luminance data and a plurality of chrominance data. The WDR unit 204 may generate dynamic range luminance data by combining the plurality of luminance data with each other, and may generate dynamic range chrominance data by calculating an average of the plurality of chrominance data. The second conversion unit 206 may convert the dynamic range luminance data and the dynamic range chrominance data into the current image data CFD.

In some example embodiments, the image signal processor 200 may further perform image interpolation, color correction, white balance, gamma correction, color conversion, etc.

The display unit 300 may display the current frame image based on the current image data CFD. For example, the display unit 300 may include a liquid crystal display (LCD) device, an organic light emitting display (OLED) device, or the like.

Figure 20:
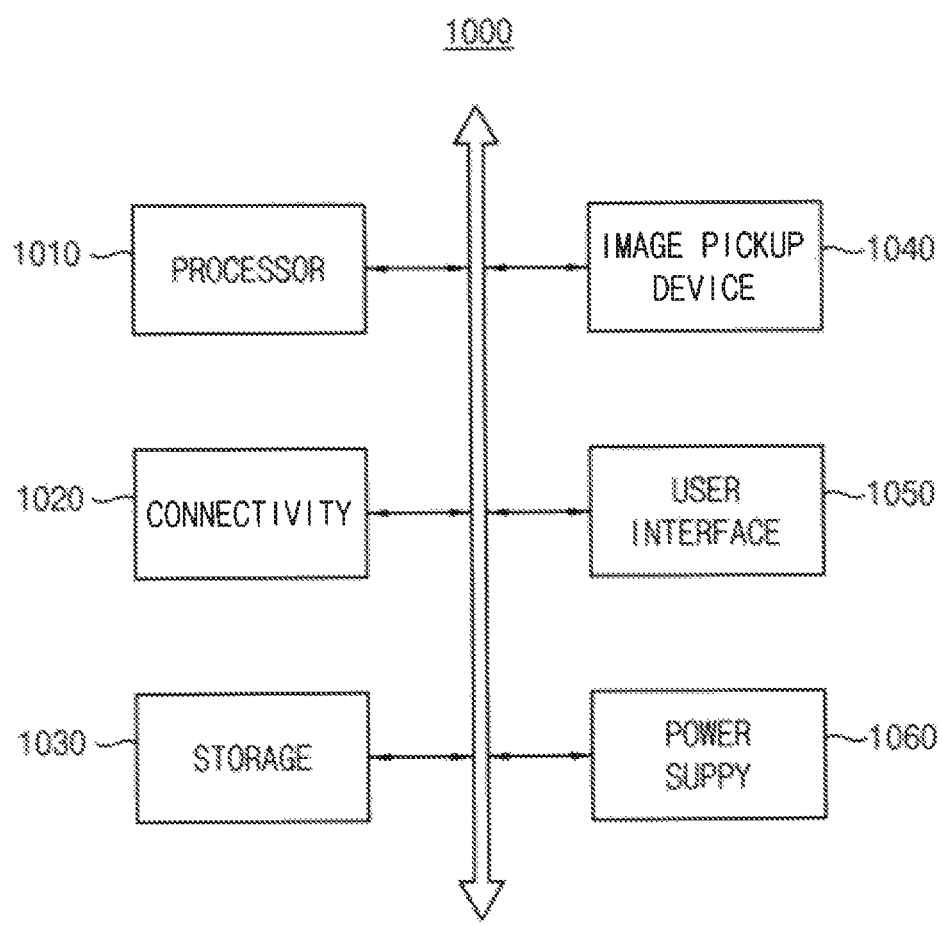
FIG. 20 is a block diagram illustrating an electronic system according to example embodiments.

FIG. 20 is a block diagram illustrating an electronic system according to example embodiments.

Referring to FIG. 20, an electronic system 1000 includes a processor 1010 and an image pickup device 1040. The electronic system 1000 may further include a connectivity module 1020, a storage device 1030, a user interface 1050 and a power supply 1060.

The processor 1010 controls overall operations of the electronic system 1000. The image pickup device 1040 is controlled by the processor 1010. The image pickup device 1040 may be the image pickup device 500 of FIG. 19. The image pickup device 1040 may generate a WDR image by combining a plurality of subframe images such that the number of exposure times included in the WDR image is greater than the number of the subframe images. Accordingly, the WDR image having a relatively high or extended dynamic range may be generated using relatively few resources.

In some example embodiments, the processor 1010 and an image signal processor (e.g., the image signal processor 200 in FIG. 19) included in the image pickup device 1040 may be integrated with each other. For example, the image signal processor may be included in the processor 1010.

The connectivity module 1020 may communicate with an external device (not shown). The storage device 1030 may operate as a data storage for data processed by the processor 1010 or a working memory in the electronic system 1000. The user interface 1050 may include at least one input device such as, for example, a keypad, a button, a microphone, a touch screen, etc., and/or at least one output device such as, for example, a speaker, a display device, etc. The power supply 1060 may provide power to the electronic system 1000.

The present disclosure may be applied to various devices and systems that include the image pickup device. For example, the present disclosure may be applied to systems such as be a mobile phone, a smart phone, a tablet computer, a laptop computer, a personal digital assistants (PDA), a portable multimedia player (PMP), a digital camera, a portable game console, a wearable system, an internet of things (IoT) system, a three-dimensional (3D) geometry reconstruction system, an array camera system, a virtual reality (VR) system, an augmented reality (AR) system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of obtaining a wide dynamic range (WDR) image, the method comprising:
    generating a first subframe image by exposing each of a plurality of pixels of an image sensor with a first exposure time and performing a first readout operation on the plurality of pixels;
    generating, after completing the generating of the first subframe image and the performing of the first readout operation, a second subframe image by exposing each of first pixels of the plurality of pixels with a second exposure time and each of second pixels of the plurality of pixels with a third exposure time and by performing a second readout operation on the plurality of pixels, the first exposure time, the second exposure time and the third exposure time being different from one another; and
    generating a current frame image having pixel data obtained from the exposing with the first exposure time, the second exposure time and the third exposure time by combining the first subframe image with the second subframe image.

2. The method of claim 1,
    wherein a number of different exposure times of the plurality of pixels used to generate the current frame image is greater than a number of readout operations performed for generating the current frame image, and
    wherein each readout operation comprises reading pixel data from all of the plurality of pixels.

3. The method of claim 1, wherein generating the first subframe image includes:
    setting an exposure time for all of the plurality of pixels to the first exposure time;
    exposing each of the plurality of pixels for a duration equal to the first exposure time; and
    reading out first sub image data corresponding to the first subframe image from all of the plurality of pixels.

4. The method of claim 3, wherein generating the second subframe image includes:
    setting an exposure time for first pixels among the plurality of pixels to the second exposure time;
    setting an exposure time for second pixels among the plurality of pixels to the third exposure time;
    exposing the first pixels for a duration equal to the second exposure time and exposing the second pixels for a duration equal to the third exposure time; and
    reading out second sub image data corresponding to the second subframe image from the first pixels and the second pixels.

5. The method of claim 4, wherein starting points of exposing the first pixels are different from starting points of exposing the second pixels such that the exposure time for the first pixels is different from the exposure time for the second pixels.

6. The method of claim 5, wherein the plurality of pixels are sequentially read out from a first pixel row to a last pixel row.

7. The method of claim 4, wherein a predetermined number of a plurality of first line image data included in the first sub image data and a plurality of second line image data included in the second sub image data are alternately read out,
    wherein an interpolating operation and a merging operation are performed on the plurality of second line image data, wherein a re-ordering operation is performed on the plurality of first line image data and the plurality of second line image data, respectively, and wherein the first subframe image is generated by merging and combining the plurality of re-ordered first line image data, and the second subframe image is generated by merging and combining the plurality of re-ordered second line image data.

8. The method of claim 4, wherein generating the current frame image includes:

converting the first sub image data into first luminance data and first chrominance data;

converting the second sub image data into second luminance data and second chrominance data;

generating dynamic range luminance data by combining the first luminance data with the second luminance data;

generating dynamic range chrominance data by calculating an average of the first chrominance data and the second chrominance data; and converting the dynamic range luminance data and the dynamic range chrominance data into current image data corresponding to the current frame image.

9. The method of claim 1, wherein the first exposure time is set based on at least one of exposure times used to obtain a previous frame image prior to the current frame image, and wherein the second exposure time and the third exposure time are set based on the first exposure time.

10. The method of claim 1, wherein the second subframe image further has a fourth exposure time different from the first exposure time, the second exposure time and the third exposure time, and wherein the current frame image that is generated by combining the first subframe image with the second subframe image is generated from pixel data obtained from the exposing with the first exposure time, the second exposure time, the third exposure time and the fourth exposure time.

11. The method of claim 1, wherein the first subframe image further has a fourth exposure time different from the first exposure time, the second exposure time and the third exposure time, and wherein the current frame image that is generated by combining the first subframe image with the second subframe image is generated from pixel data obtained from the exposing with the first exposure time, the second exposure time, the third exposure time and the fourth exposure time.

12. The method of claim 11, wherein a first exposure pattern of the first subframe image is substantially the same as a second exposure pattern of the second subframe image, wherein the first exposure pattern represents an arrangement of a first region corresponding to the first exposure time and a second region corresponding to the fourth exposure time in the first subframe image, and wherein the second exposure pattern represents an arrangement of a third region corresponding to the second exposure time and a fourth region corresponding to the third exposure time in the second subframe image.

13. The method of claim 11, wherein a first exposure pattern of the first subframe image is different from a second exposure pattern of the second subframe image, wherein the first exposure pattern represents an arrangement of a first region corresponding to the first exposure time and a second region corresponding to the fourth exposure time in the first subframe image, and wherein the second exposure pattern represents an arrangement of a third region corresponding to the second exposure time and a fourth region corresponding to the third exposure time in the second subframe image.

14. The method of claim 11, further comprising:

generating a third subframe image having a fourth exposure time by performing a third readout operation on all of the plurality of pixels, the fourth exposure time being different from the first exposure time, the second exposure time and the third exposure time, and wherein the current frame image is generated by combining the first subframe image obtained with the first exposure time, the second subframe image obtained with the second and third exposure times and the third subframe image obtained with the fourth exposure time.

15. An image pickup device comprising:

an image sensor comprising:

a pixel array including a plurality of pixels; and a readout circuit configured for generating a first subframe image by exposing each of the plurality of pixels of the image sensor with a first exposure time and performing a first readout operation on the plurality of pixels, and configured for generating a second subframe image by exposing each of first pixels of the plurality of pixels of the image sensor with a second exposure time and each of second pixels of the plurality of pixels with a third exposure time and by performing a second readout operation on the plurality of pixels, the first exposure time, the second exposure time and the third exposure time being different from one another, wherein the first pixels of the plurality of pixels are exposed with the first exposure time and the second exposure time and the second pixels of the plurality of pixels are exposed with the first exposure time and the third exposure time, and an image signal processor configured for generating a current frame image having pixel data obtained from the exposing with the first exposure time, the second exposure time and the third exposure time by combining the first subframe image with the second subframe image.

16. A method of obtaining a wide dynamic range (WDR) image, the method comprising:

generating a plurality of n subframes by exposing pixels of a same image sensor using at least n+1 different exposure times, wherein n is an integer equal to or greater than 2; and generating a current frame image from pixel data obtained with said at least n+1 exposure times by combining pixel data from only said n subframes, wherein at least three of said n+1 exposure times are different from each other.

17. The method of claim 16, wherein the plurality of n subframes include a first subframe having pixel data obtained with a first exposure time and a second subframe having pixel data obtained with second and third exposure times.

18. The method of claim 16, wherein the plurality of n subframes include a first subframe having pixel data obtained with first and second exposure times and a second subframe having pixel data obtained with third and fourth exposure times.

19. The method of claim 17, wherein the number of exposure times used to obtain pixel data included in the current frame image is greater than the number of readout operations performed for generating the current frame image, wherein each readout operation comprises reading pixel data from all of the pixels.

20. The method of claim 18, wherein the number of exposure times used to obtain pixel data included in the current frame image is greater than the number of readout operations performed for generating the current frame image, wherein each readout operation comprises reading pixel data from all of the pixels.

* * * * *